United States Patent
Uchikawa et al.

(10) Patent No.: US 8,672,820 B2
(45) Date of Patent: Mar. 18, 2014

(54) TOOL STOCKER, MACHINE TOOL SYSTEM, AND TOOL DAMAGE DETECTING APPARATUS

(75) Inventors: Motoki Uchikawa, Utsunomiya (JP); Shoji Shibata, Utsunomiya (JP); Takeshi Shibata, Utsunomiya (JP); Shugo Arakawa, Utsunomiya (JP); Masakazu Kubo, Utsunomiya (JP); Tatsuhiko Tanaka, Utsunomiya (JP); Kenichi Masuda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1139 days.

(21) Appl. No.: 12/630,555

(22) Filed: Dec. 3, 2009

(65) Prior Publication Data

US 2010/0145498 A1 Jun. 10, 2010

(30) Foreign Application Priority Data

Dec. 4, 2008 (JP) ................. 2008-310156
Dec. 4, 2008 (JP) ................. 2008-310164
Dec. 5, 2008 (JP) ................. 2008-311082

(51) Int. Cl.
*B23Q 3/157* (2006.01)
*B23C 5/26* (2006.01)
*B23Q 11/08* (2006.01)
*B23Q 7/02* (2006.01)
*B23C 1/04* (2006.01)
*B23C 1/14* (2006.01)

(52) U.S. Cl.
USPC ............. 483/54; 483/37; 483/64; 483/61; 483/65; 483/67; 483/68; 483/3; 409/200; 409/134; 409/192; 29/33 P

(58) Field of Classification Search
USPC ................. 483/37, 64, 63, 60–61, 54, 56, 57, 483/39–40, 44, 49, 51, 3, 67–68, 65; 409/231, 201, 211, 216, 192, 213, 217, 409/203, 134, 200; 29/33 P
See application file for complete search history.

(56) References Cited

U.S. PATENT DOCUMENTS

| | | | | |
|---|---|---|---|---|
| 3,355,797 A | * | 12/1967 | Lohneis | 483/66 |
| 4,196,501 A | * | 4/1980 | Shimajiri et al. | 483/54 |
| 4,675,977 A | * | 6/1987 | Kolblin et al. | 483/1 |
| 5,762,594 A | * | 6/1998 | Hoppe | 483/56 |
| 2006/0189464 A1 | * | 8/2006 | Corbean et al. | 483/63 |

(Continued)

FOREIGN PATENT DOCUMENTS

DE 36 44024 A1 6/1988
DE 258 580 A1 7/1988

(Continued)

*Primary Examiner* — Erica E Cadugan
(74) *Attorney, Agent, or Firm* — Arent Fox LLP

(57) ABSTRACT

A tool stocker includes main stockers for holding a plurality of tools detachably mounted on a main spindle for machining a workpiece, an auxiliary stocker for holding and transferring tools to and from the main stockers, and a tool transfer mechanism for transferring tools between the main stockers and the auxiliary stocker. The auxiliary stocker includes a plurality of tool pods for removably supporting the tools therein, a rail in sliding engagement with outer surfaces of the tool pods, a chain for moving the tool pods in sliding engagement with the rail, and a motor for actuating the chain. The rail has a recess defined therein in alignment with the tool transfer mechanism, such that the tools transferred by the tool transfer mechanism pass through the recess.

5 Claims, 33 Drawing Sheets

(56) References Cited

U.S. PATENT DOCUMENTS

| | | |
|---|---|---|
| 2009/0043418 A1 | 2/2009 | Diemer et al. |
| 2009/0053004 A1 | 2/2009 | Yamaura et al. |
| 2010/0205800 A1* | 8/2010 | Benz et al. ............ 483/38 |

FOREIGN PATENT DOCUMENTS

| | | | |
|---|---|---|---|
| DE | 200 11 721 U1 | | 11/2000 |
| DE | 10 2007 037 498 A1 | | 2/2009 |
| DE | 10 2008 013 112 A | | 9/2009 |
| JP | 55-157450 A | * | 12/1980 |
| JP | 56-126551 A | * | 10/1981 |
| JP | 58-113432 U | | 8/1983 |
| JP | 02-088139 A | * | 3/1990 |
| JP | 06-304835 A | * | 11/1994 |
| JP | 2000-280139 A | | 10/2000 |
| JP | 2001-018136 A | | 1/2001 |
| JP | 3369712 B2 | | 11/2002 |
| JP | 2007-125642 A | | 5/2007 |
| WO | WO 2007/102435 A1 | | 9/2007 |

* cited by examiner

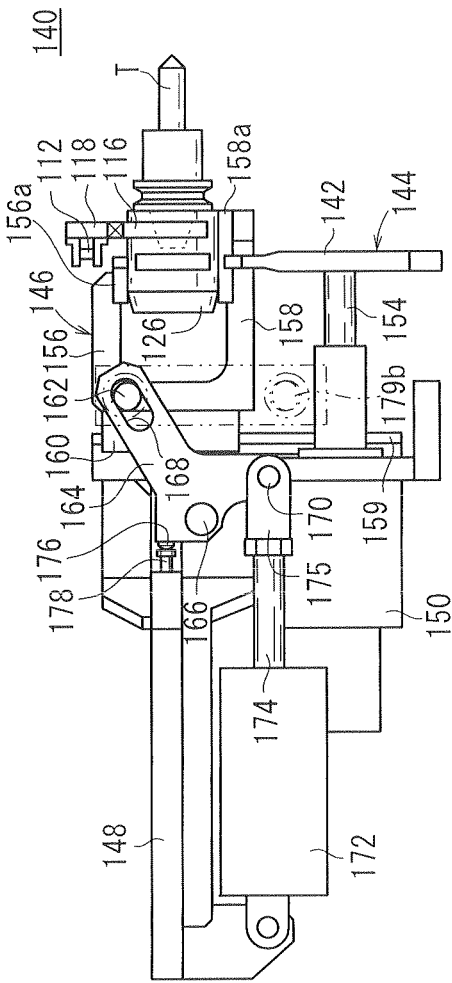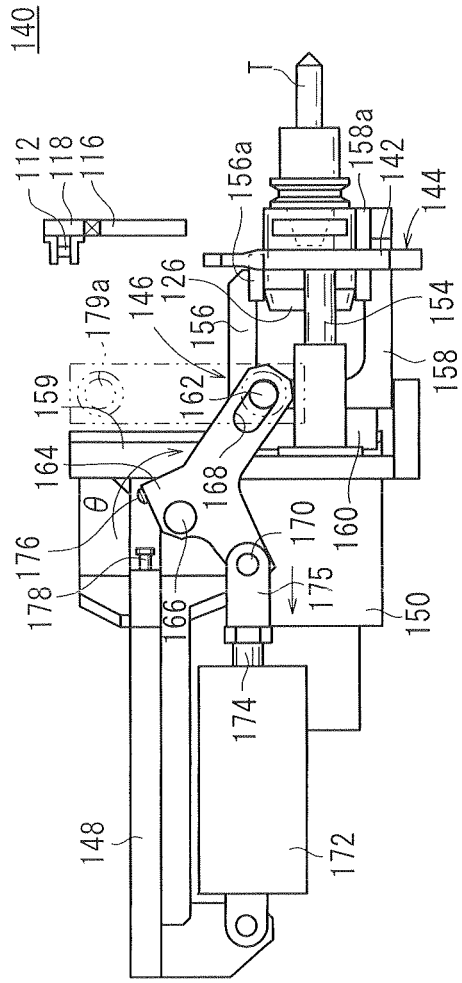

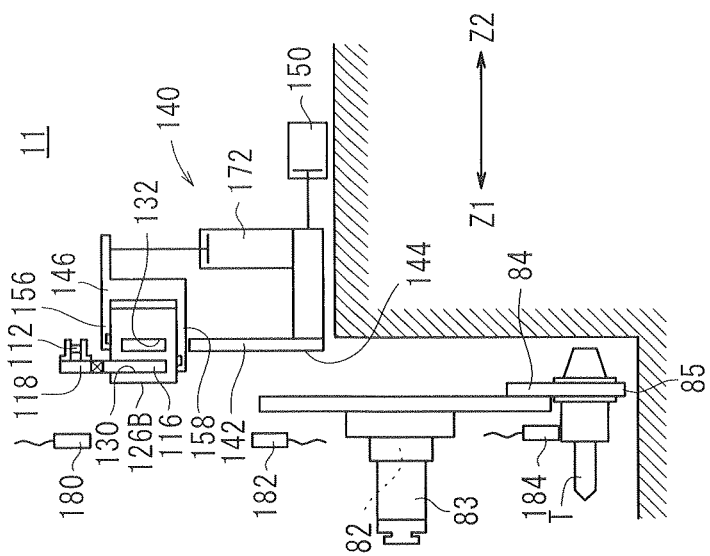

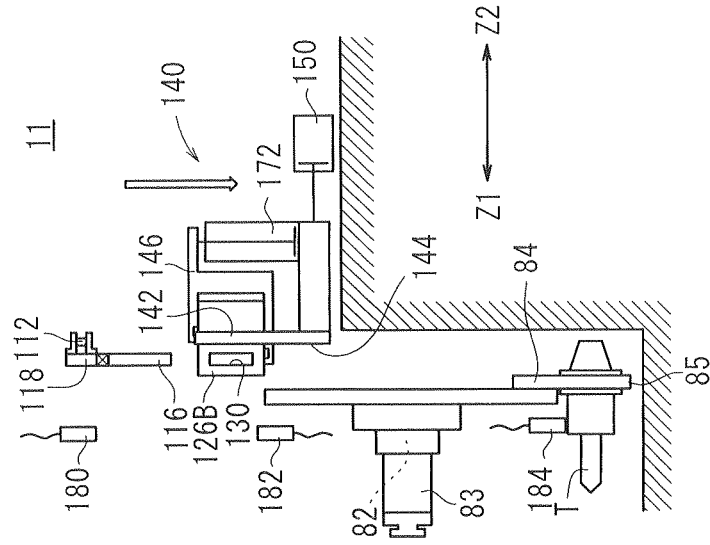
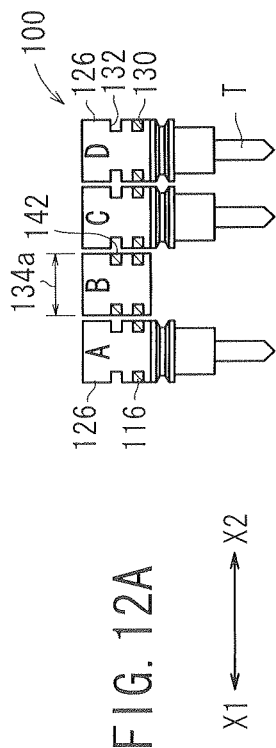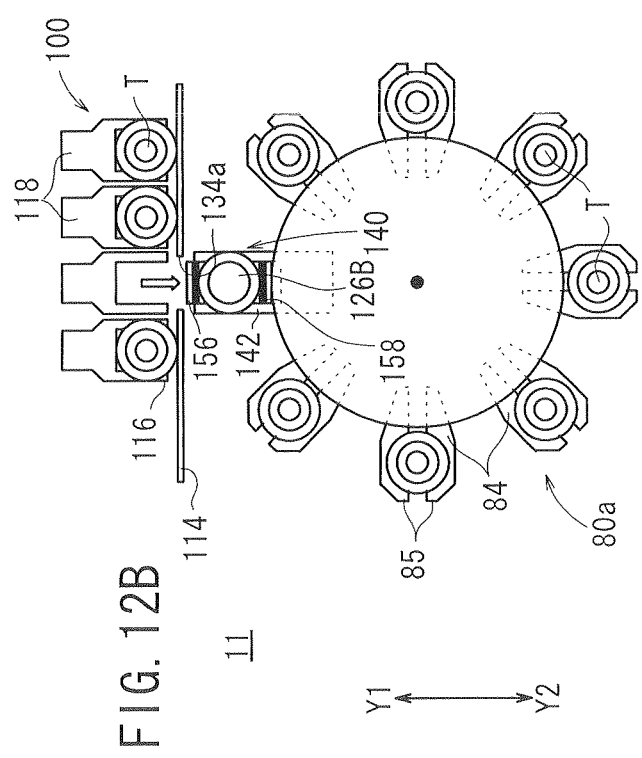

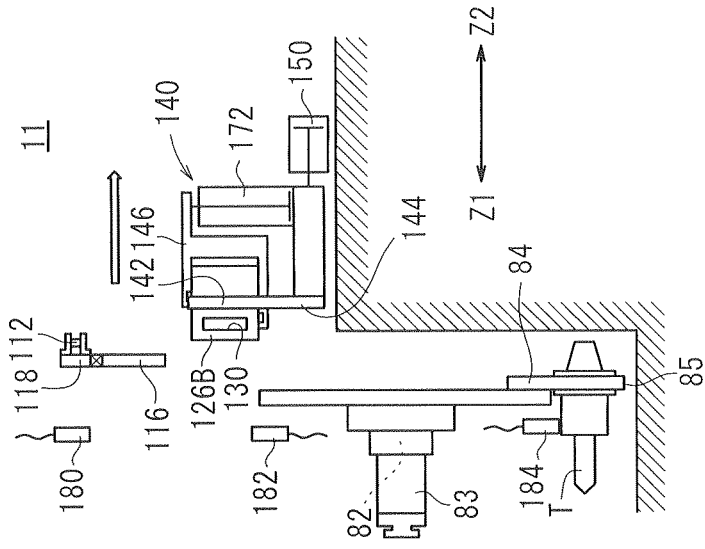

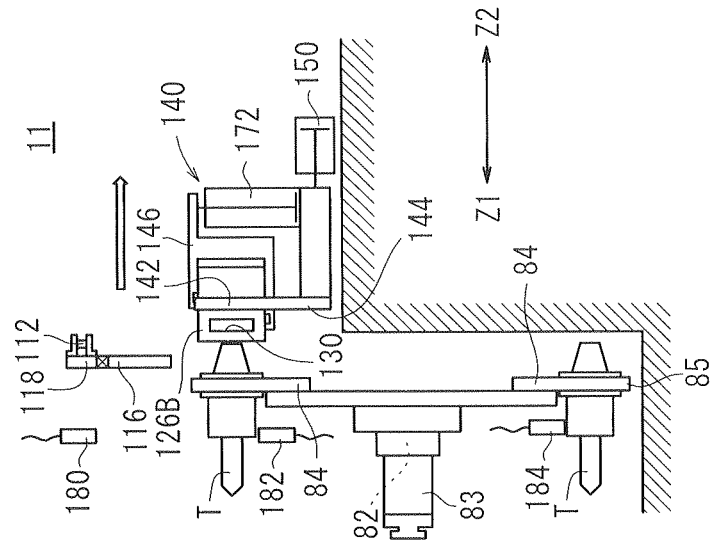

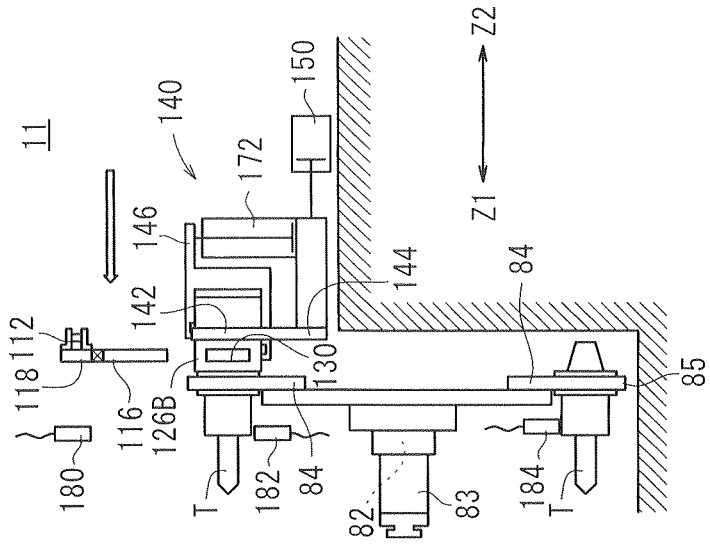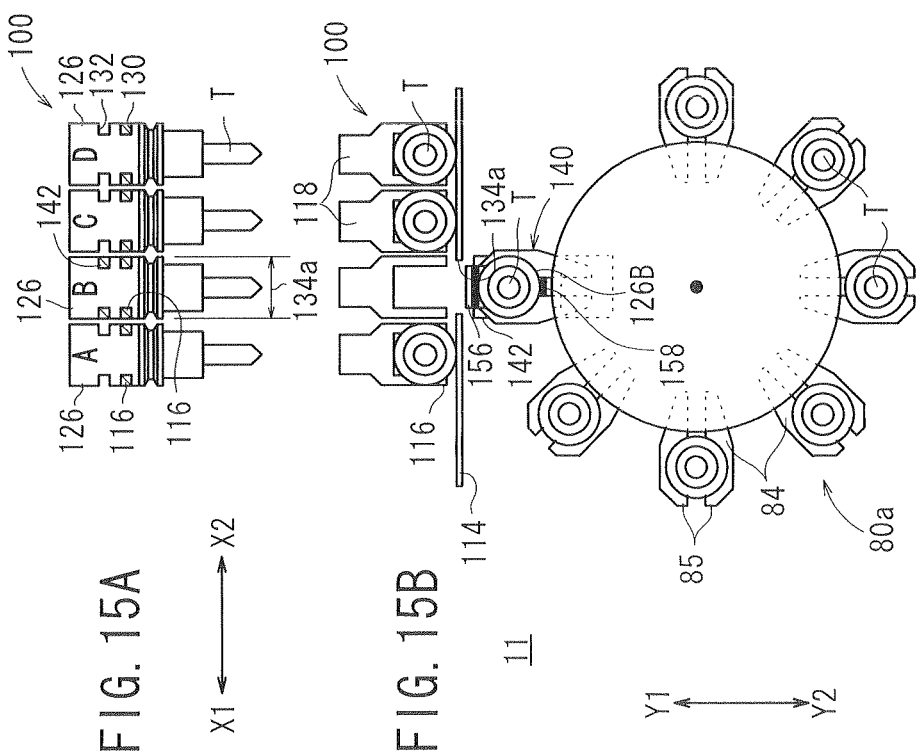

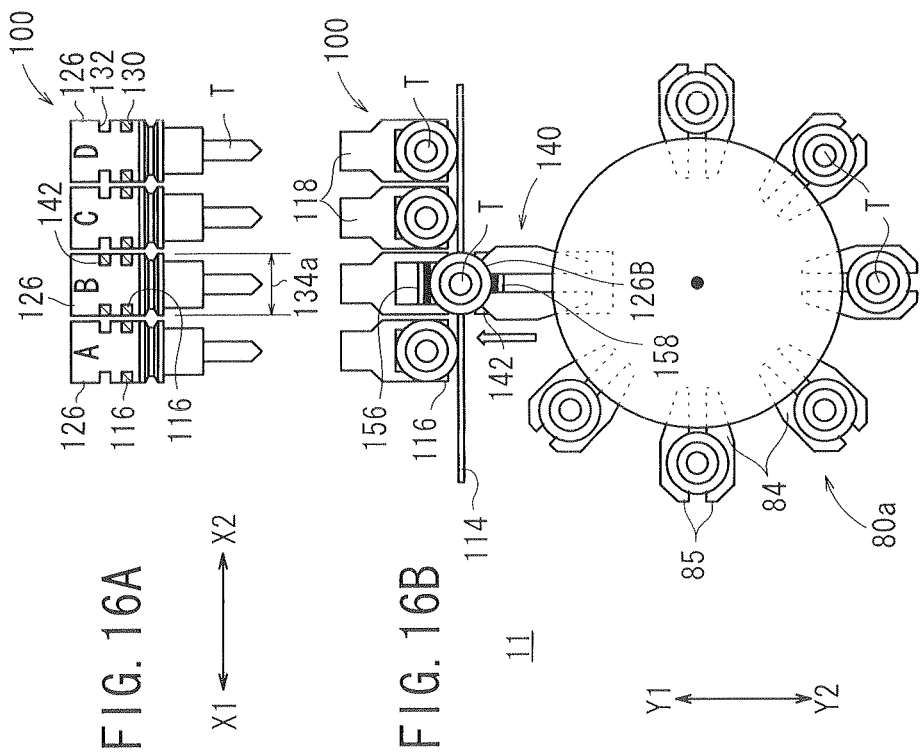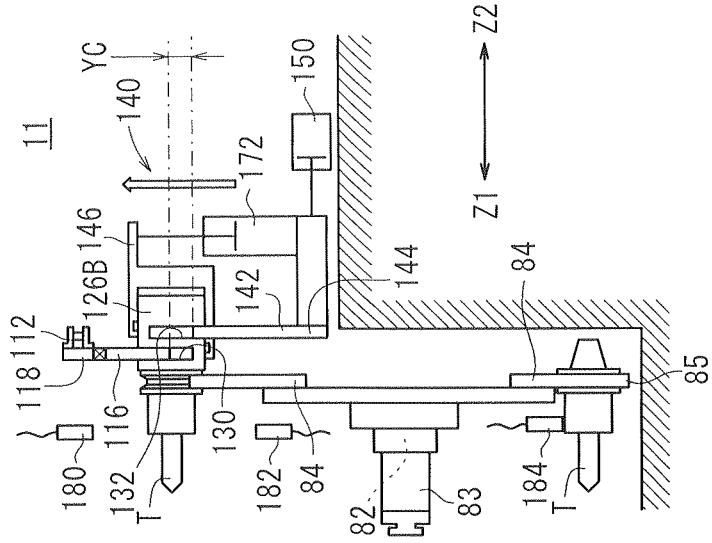

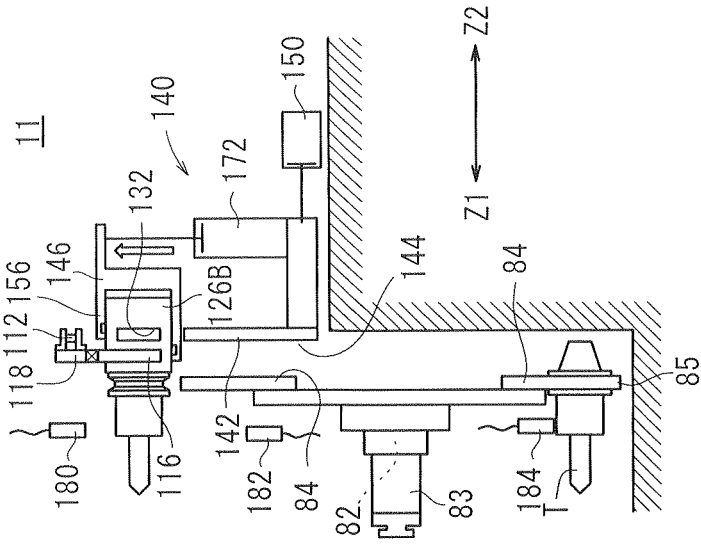
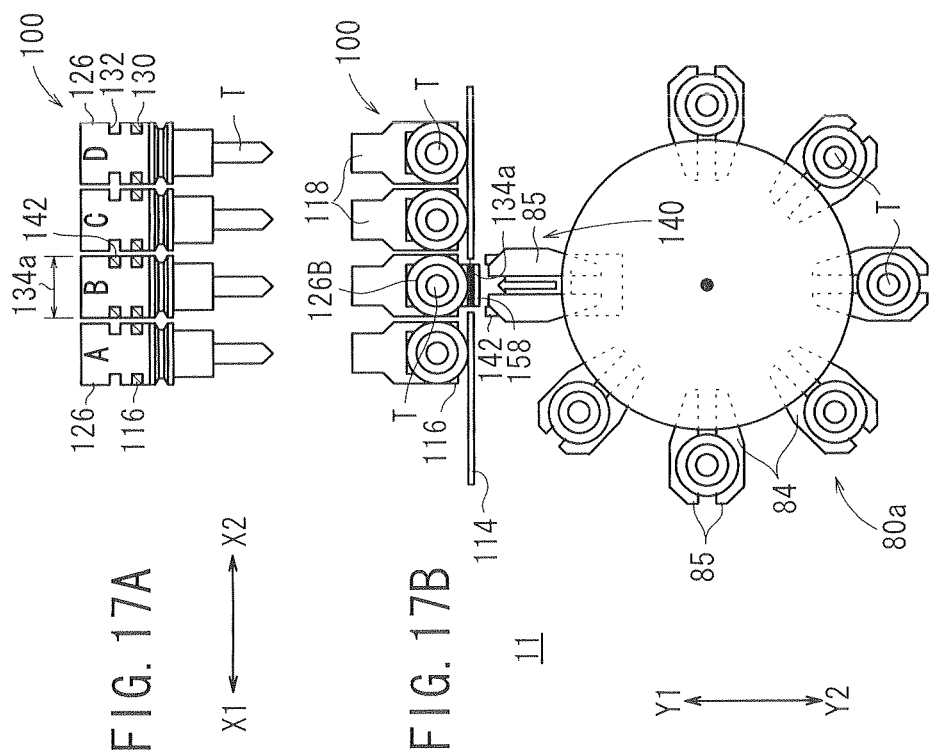

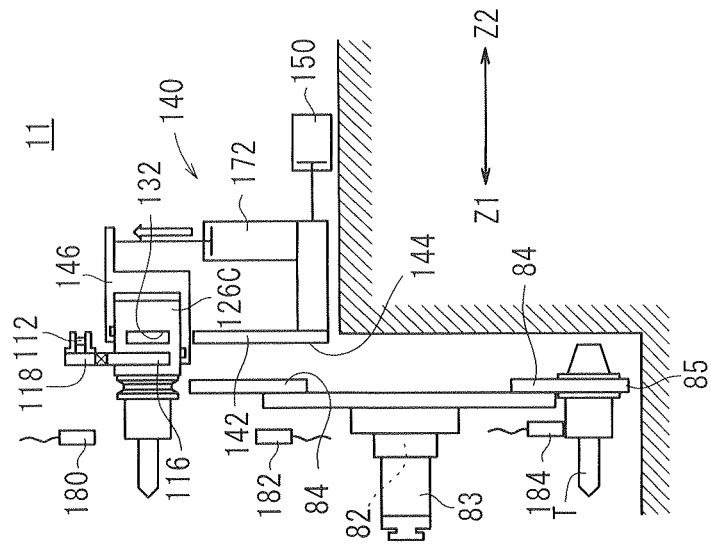
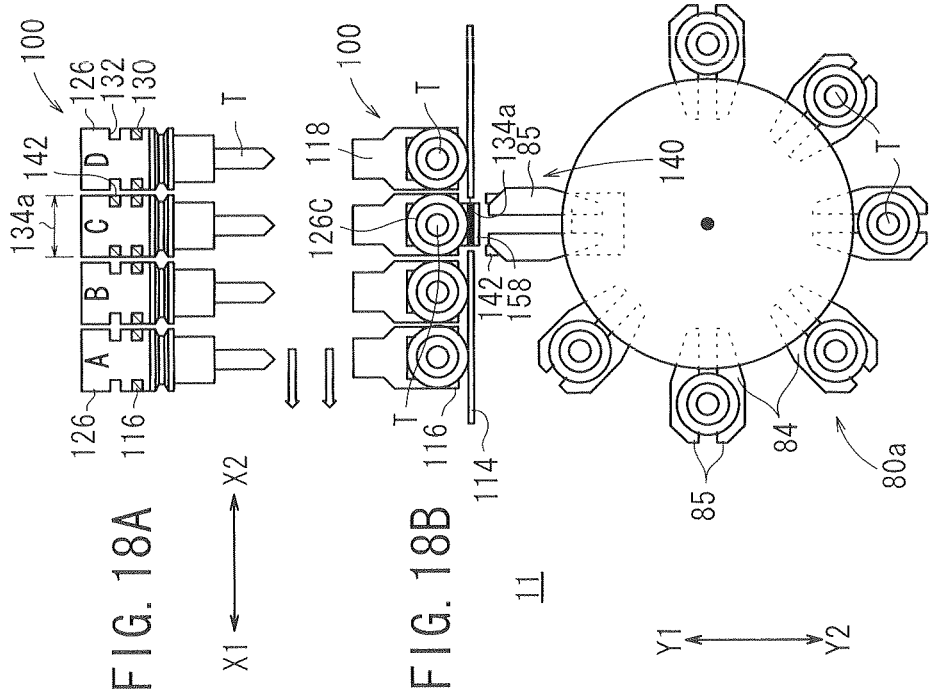

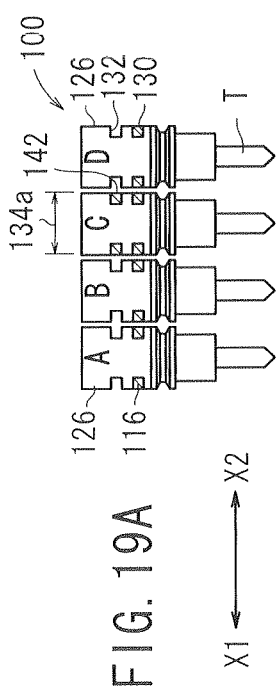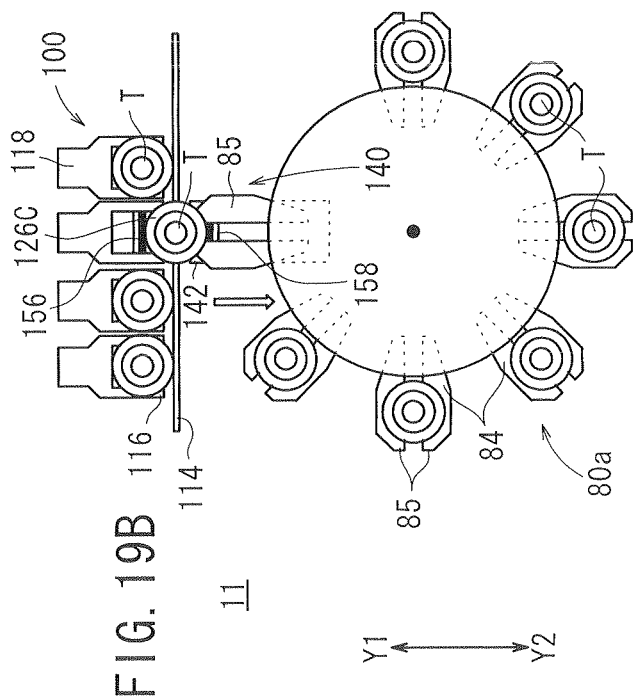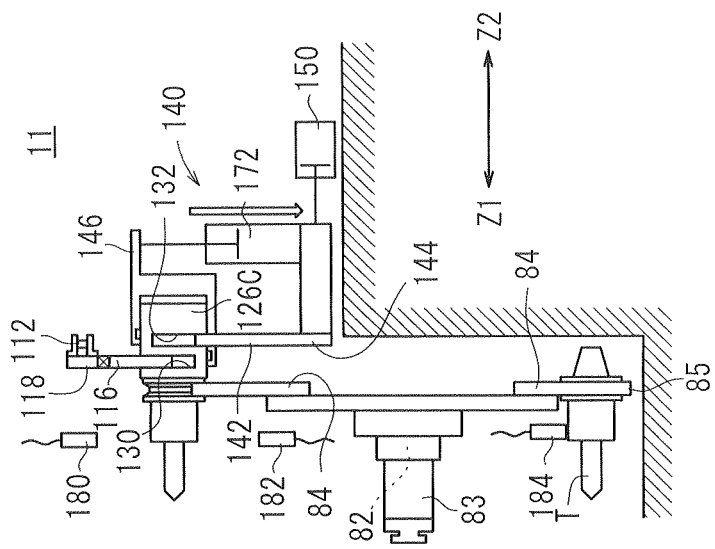

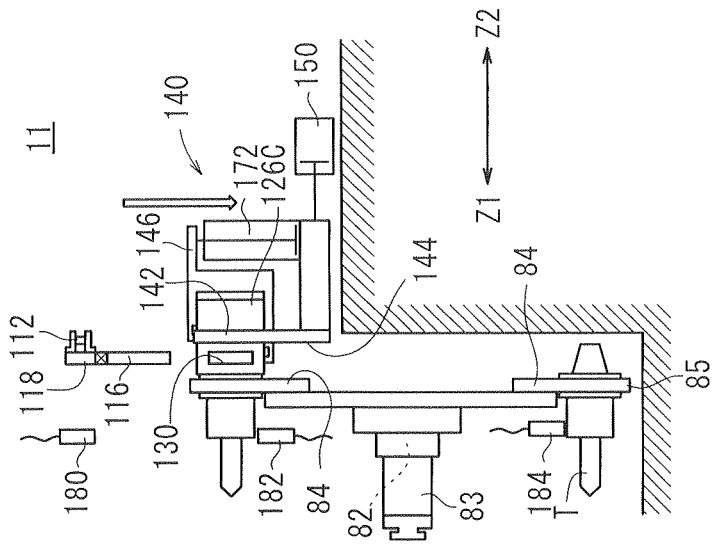

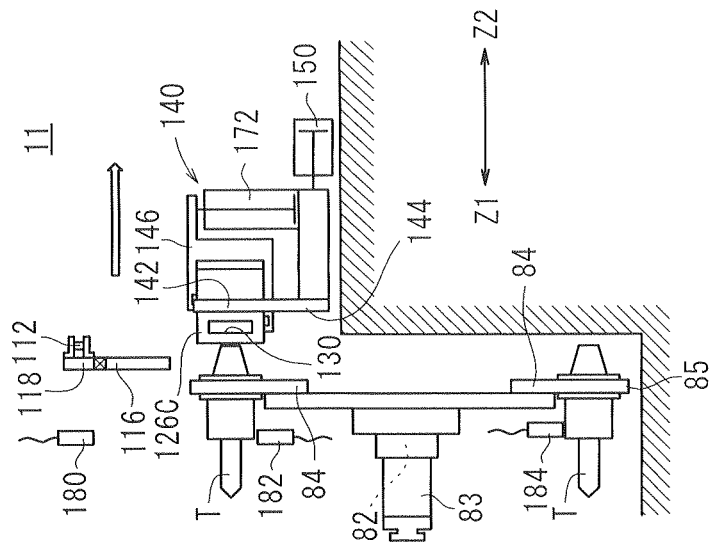

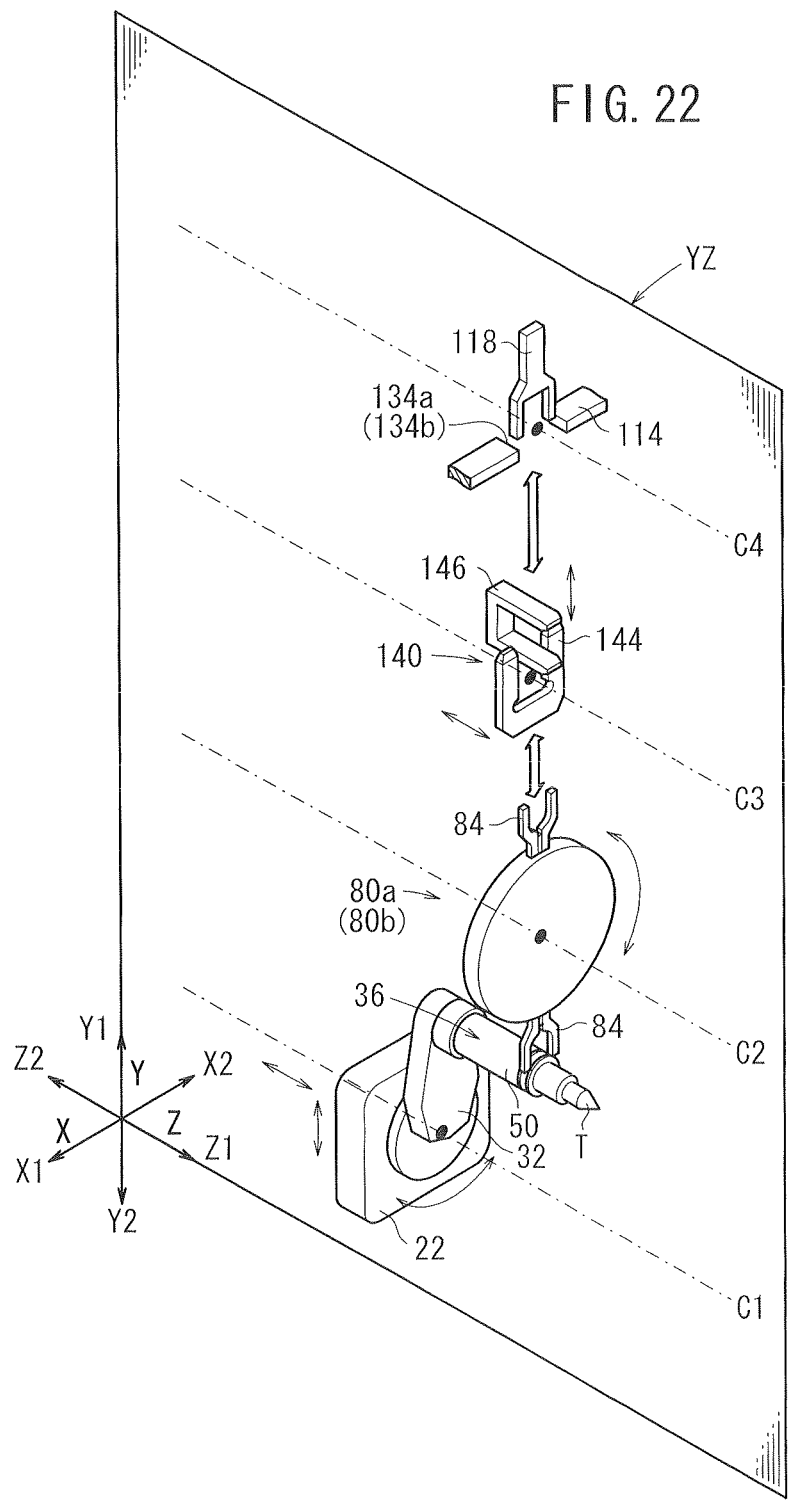

FIG. 27
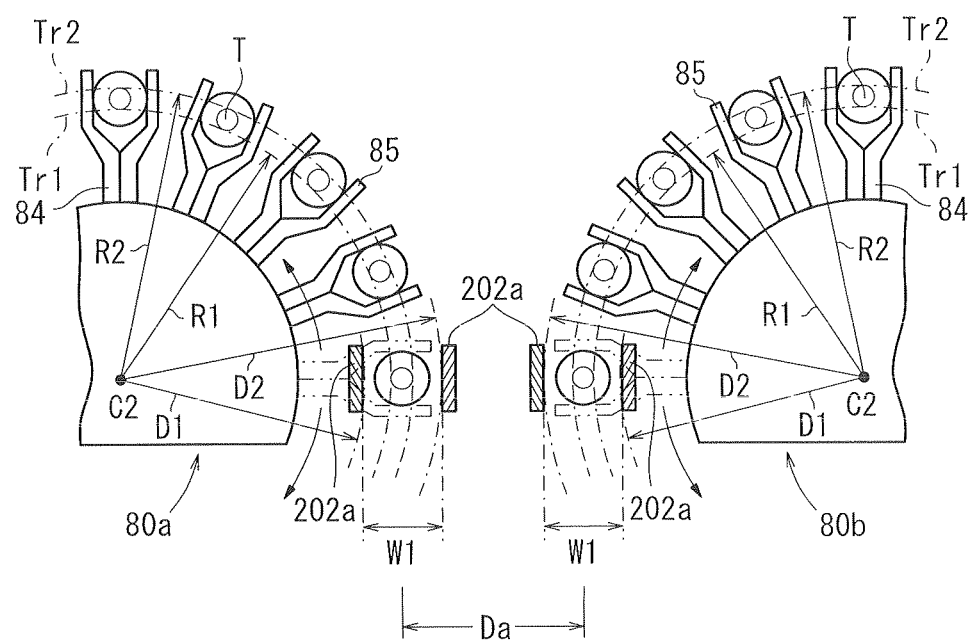
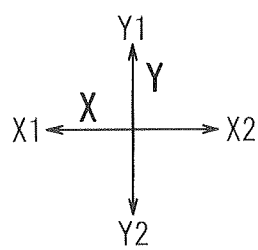

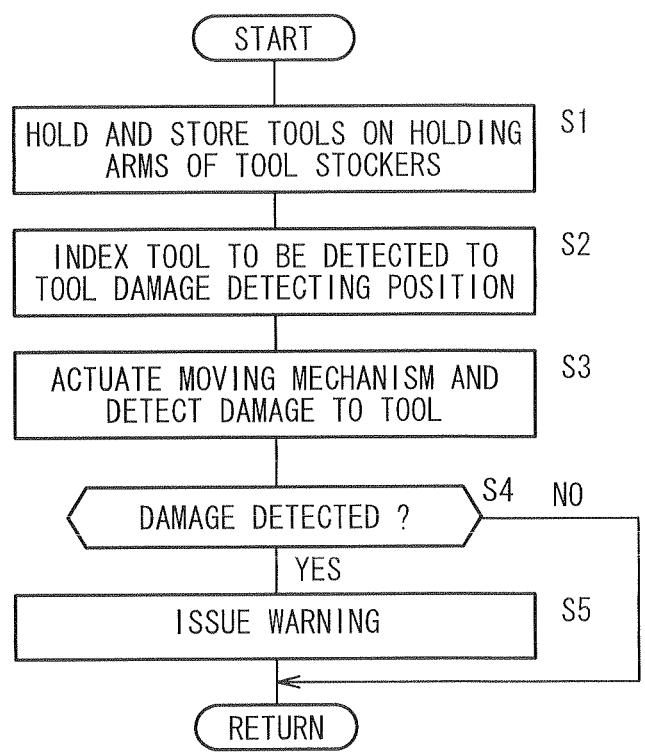

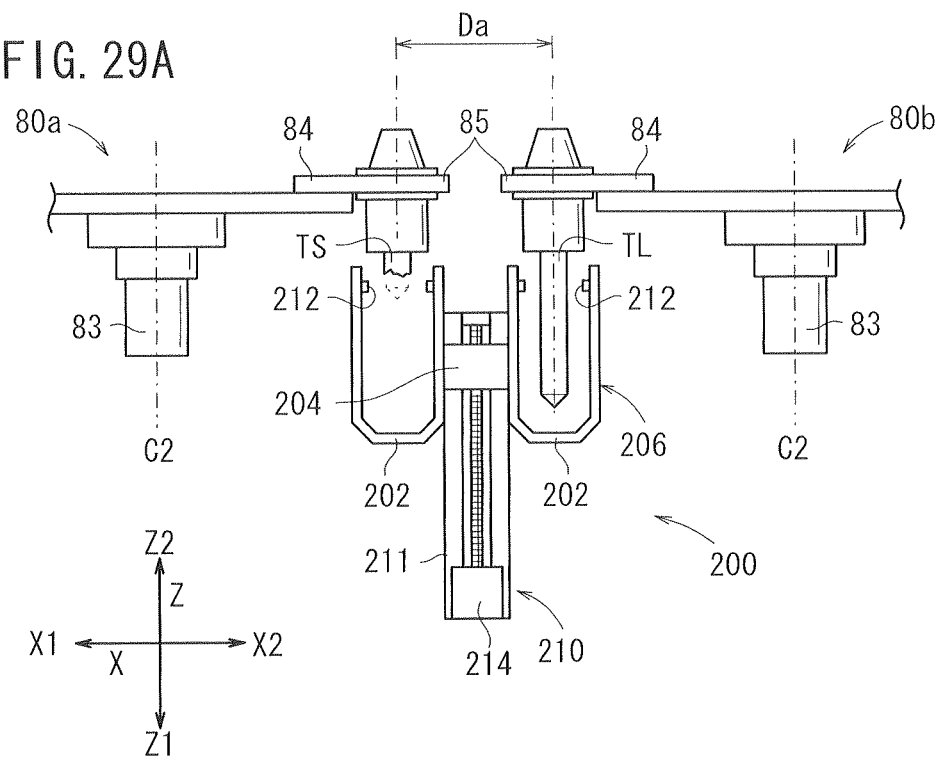
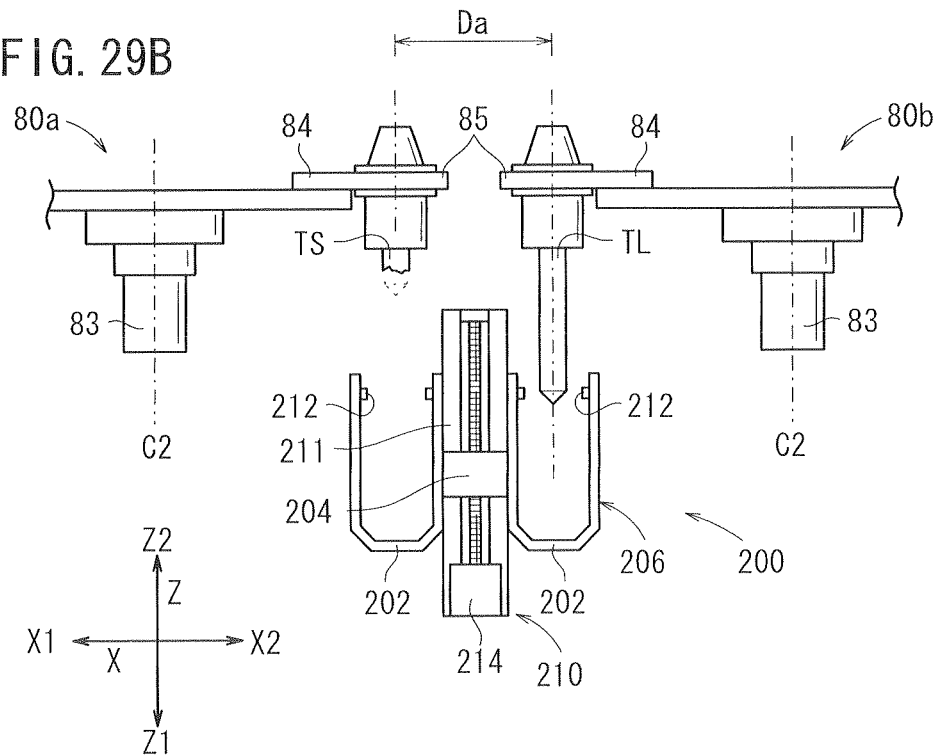

FIG. 32
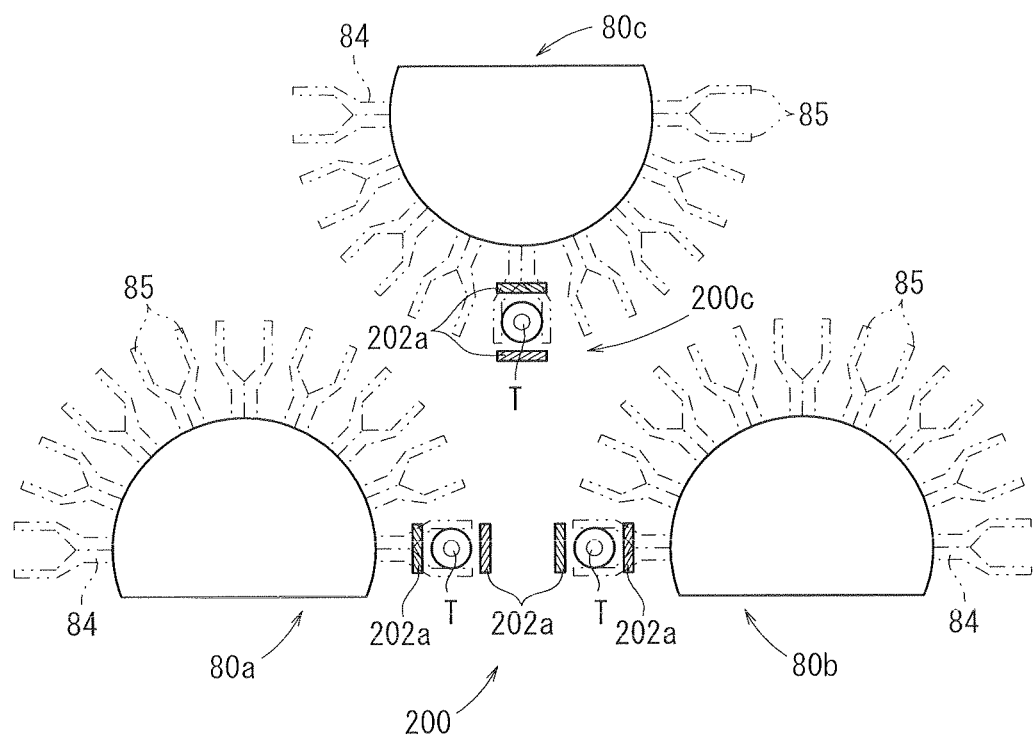
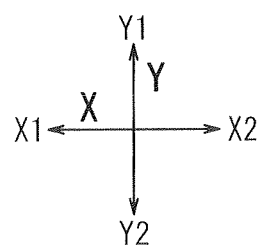

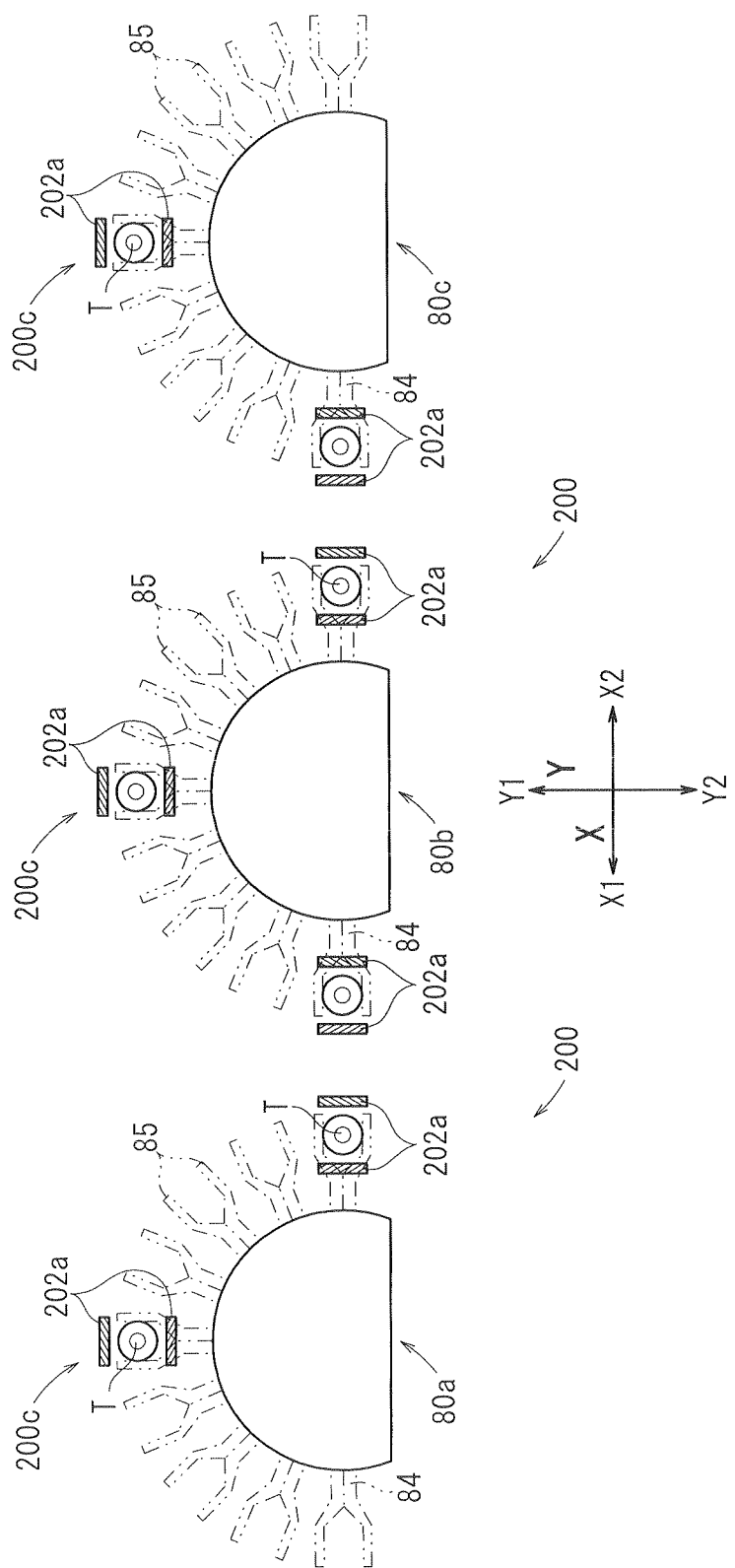

TOOL STOCKER, MACHINE TOOL SYSTEM, AND TOOL DAMAGE DETECTING APPARATUS

CROSS-REFERENCE TO RELATED APPLICATION

This application is based upon and claims the benefit of priority from Japanese Patent Applications No. 2008-310156 filed on Dec. 4, 2008, No. 2008-310164 filed on Dec. 4, 2008 and No. 2008-311082 filed on Dec. 5, 2008, of which the contents are incorporated herein by reference.

BACKGROUND OF THE INVENTION

1. Field of the Invention

The present invention relates to a tool stocker for holding and storing a plurality of tools that can detachably be mounted on a main spindle for machining a workpiece, a machine tool system that incorporates such a tool stocker therein, and a tool damage detecting apparatus for use in a machine tool system.

2. Description of the Related Art

Generally, machine tool systems have been used in the art, which have a tool stocker for holding and storing a plurality of detachable tools, and which machine a workpiece in various machining modes with tools selected from the tool stocker, wherein the tools are replaceably mounted on a main spindle. Such machine tool systems should preferably take up a small area in order to improve installation space efficiency and to facilitate the transfer of workpieces between adjacent machine tools. It is preferable for a machine tool system to have a small width as viewed in front elevation, in light of the relationship of the machine tool system to other apparatus within the factory. However, the machine tool system needs to have a sufficiently large tool stocker and a sufficiently large number of stored tools.

Japanese Laid-Open Patent Publication No. 2007-125642 discloses a tool exchange apparatus combined with a machine tool, which has a main tool stocker for storing tools and an auxiliary tool stocker for storing fewer tools than the main tool stocker, so that the tool exchange apparatus can hold an increased number of tools without increasing the installation space. A tool in the main tool stocker is transferred to a main spindle as follows: A tool pod which stores the tool is turned 90° and then the tool is pulled out of the tool pod by a turn arm. The tool is then turned 180° by the turn arm and is inserted into (mounted on) the main spindle. A tool in the auxiliary took stocker is similarly transferred to the main spindle.

In systems that use a number of tools, it is important to grasp the states of the respective tools in order to carry out smooth and automatic machining operations, and also in view of cycle times. For example, in the event that a tool becomes damaged by seizure or the like during a machining process, it is desirable to quickly detect damage to the tool and to replace the tool if necessary in order to avoid a system shutdown.

Japanese Patent No. 3369712 discloses a tool damage detecting apparatus incorporated within a turret system for machining a workpiece mounted on a slide unit, which has been moved into a machining position. The slide unit supports thereon a machining head (gang head) on which a plurality of main spindles are rotatably mounted. The turret system includes four machining units disposed around a turn shaft, each having a plurality of tools, wherein the machining units are turned and indexed around the axis of the turn shaft. One of the machining units, which is indexed to a low position, is used to machine a workpiece, whereas the tool damage detecting apparatus is disposed in association with the machining unit, which is indexed to an upper position opposite to the low position.

The tool exchange apparatus disclosed in Japanese Laid-Open Patent Publication No. 2007-125642 is required to perform at least three different actions when transferring a tool from the main tool stocker or the auxiliary tool stocker to the main spindle, including pulling a tool from a tool pod, turning the tool with the turn arm, and inserting the tool into the main spindle.

The above operations for transferring the tool are complex, and involve turning of the tool. Therefore, such operations tend to cause a tool transfer failure, due to positional misalignments between the tool stockers and a tool gripper of the main spindle, as well as dislodgment of the tool from the turn arm.

Since the tool is turned by the turn arm, it is likely to cause the machine tool to wobble laterally and vibrate, possibly lowering the accuracy with which workpieces can be machined, and producing noise. Such lateral wobbling movement and vibration should desirably be held to a minimum, particularly in space-saving systems having a reduced width as viewed in front elevation.

The tool damage detecting apparatus disclosed in Japanese Patent No. 3369712 serves to detect damage to a plurality of tools on a certain machining unit of the turret system.

If the machining units are assigned successive letters "a" through "d" from the machining unit in the lowest position for machining the workpiece, then the machining unit in an upper position associated with the tool damage detecting apparatus is identified by "c". If the turret system is controlled to machine the workpiece with the machining unit "a" initially in the lowest position, then to machine the workpiece with an adjacent machining unit "b" brought into the lowest position, and thereafter to machine the workpiece again with the machining unit "a" brought into the lowest position, in this case, the machining unit "a" is unable to reach the tool damage detecting apparatus over a plurality of machining cycles. Consequently, even if a tool used by the machining unit "a" becomes damaged during the first machining cycle, the damage will not be detected by the tool damage detecting apparatus and the tool will continue to be used. Stated otherwise, if the workpiece is machined continuously only by a certain machining unit, without the turn shaft being rotated, then damage to a tool in the machining unit will not be detected.

One solution would be to rotate the turn shaft to enable the tool damage detecting apparatus to detect tool damage each time that a machining unit machines the workpiece. However, in this case, system downtime is increased and the cycle time is extended.

SUMMARY OF THE INVENTION

A general object of the present invention is to provide a tool stocker, which is capable of easily and stably transferring tools.

Another general object of the present invention is to provide a machine tool system, which is capable of stably transferring tools while preventing a reduction in accuracy with which workpieces are machined, and minimizing noise produced by the machine tool system.

Still another general object of the present invention is to provide a tool damage detecting apparatus, which is capable of quickly detecting tool damage and avoiding system shutdowns as much as possible, for thereby increasing productivity.

A tool stocker according to the present invention includes a first tool stocker for holding a plurality of tools detachably mounted on a main spindle for machining a workpiece, a second tool stocker for holding a plurality of tools and transferring tools to and from the first tool stocker, and a tool transfer mechanism for transferring tools between the first tool stocker and the second tool stocker. The second tool stocker comprises a plurality of tool pods for supporting the tools removably therein, a rail in sliding engagement with outer surfaces of the tool pods, a moving mechanism for moving the tool pods in sliding engagement with the rail, and a drive source for actuating the moving mechanism. The rail has a recess defined therein in alignment with the tool transfer mechanism, such that the tools transferred by the tool transfer mechanism pass through said recess.

With the above arrangement, the recess allows the tool transfer mechanism to be actuated linearly in order to transfer tools linearly. Specifically, since the recess is defined in the rail, a tool that moves along the rail of the second tool stocker can be transferred directly to and from the first tool stocker through the recess, without being turned around from the rail. The tool can therefore be easily and stably transferred between the first and second tool stockers, without danger of becoming positionally displaced or dislodged. Hence, undue transfer failures can be avoided.

The transfer mechanism may transfer the tools together with the tool pods to and from the second tool stocker, and may transfer the tools to and from the first tool stocker. With this arrangement, the tools can quickly be transferred simply by moving the tool pods between the second tool stocker and the first tool stocker.

The tool transfer mechanism may move linearly through the recess for transferring the tools between the first tool stocker and the second tool stocker. Therefore, the tools can be transferred stably.

The first tool stocker may have a plurality of first holders for holding the tools, and the second tool stocker may have a plurality of second holders for holding the tool pods in coaction with the rail, the second holders being fixed to the moving mechanism and disposed in facing relation to the rail, the first holders and the second holders having respective openings for holding the tools therein. Further, the first holders and the second holders may be disposed such that when a tool is transferred in a tool transfer direction between one of the first holders of the first tool stocker and one of the second holders of the second tool stocker, the opening of the one of the first holders and the opening of the one of the second holders face each other with the recess interposed therebetween. With this arrangement, the tool can easily be transferred between the first holder and the second holder.

The tool transfer mechanism may include a first moving member for moving the tool pods in the tool transfer direction, the first moving member being positionable in the recess to complement the rail, and a second moving member for moving the tool pods along a direction in which the tools are mounted in and removed from the tool pods. When a tool held by one of the tool pods is transferred between the first tool stocker and the second tool stocker, the one of the tool pods may be moved between one of the second holders and the second moving member by the first moving member, and the tool may be mounted in and removed from one of the first holders by movement of the one of the tool pods. With this arrangement, the tool can directly be transferred to the first tool stocker simply by moving the tool pod.

A machine tool system according to the present invention includes a main spindle for supporting a tool detachably mounted thereon for machining a predetermined region of a workpiece in coaction with a turn arm, a first tool stocker for holding a plurality of tools to be detachably mounted on the main spindle, the first tool stocker being rotatable to index one of the tools at a time, a second tool stocker for holding a plurality of tools and transferring tools to and from the first tool stocker, and a tool transfer mechanism for transferring tools between the first tool stocker and the second tool stocker. The main spindle has a turning center about which the main spindle is rotatable, the first tool stocker has a rotational center about which the first tool stocker is turnable, and the second tool stocker has a tool transfer position for transferring tools to and from the tool transfer mechanism, wherein the turning center, the rotational center, and the tool transfer position are located in a substantially identical vertical plane.

With the above arrangement, since the turning center, the rotational center, and the tool transfer position are located in a substantially identical vertical plane, the tools can be transferred linearly and stably in such a substantially identical vertical plane. Since the central axes of rotatable components and turnable elements are not laterally displaced, the machine tool system as a whole is prevented from wobbling laterally and vibrating, and hence the machine tool system is prevented from producing noise. Since lateral wobbling movements and vibrating movements do not adversely affect the workpiece being machined by the main spindle, the workpiece can be machined with greater accuracy.

The first tool stocker may have a tool transfer position for transferring tools to and from the tool transfer mechanism, the tool transfer position of the first tool stocker being located in a substantially identical vertical plane. This arrangement makes it more effective to prevent the machine tool system from wobbling laterally and vibrating.

The tool transfer position of the second tool stocker may be located above the tool transfer position of the first tool stocker. With this arrangement, the installation space for the machine tool system can be reduced effectively. Although the center of gravity of the machine tool system is relatively high due to the second tool stocker being disposed in a high position, the machine tool system is stable as a whole, since the machine tool system is prevented from wobbling laterally and vibrating.

The machine tool system may further include a rotational drive source for rotating the tool supported on the main spindle, the rotational drive source being coaxial with a turning center about which the turn arm is rotatable. This arrangement also more effectively prevents the machine tool system from wobbling laterally and vibrating.

The first tool stocker may have a plurality of first holders for holding the tools, the first holders extending radially outward from a rotational center about which the first tool stocker is rotatable, and the second tool stocker may have a plurality of second holders for holding the tool pods, the first holders and the second holders having respective openings for holding the tools therein. The first holders and the second holders may be disposed such that when a tool is transferred between one of the first holders of the first tool stocker and one of the second holders of the second tool stocker, the opening of one of the first holders and the opening of one of the second holders face each other in a substantially identical vertical plane. With this arrangement, tools can easily be transferred in the vertical plane by the tool transfer mechanism, while the machine tool system is prevented from wobbling laterally and vibrating.

According to the present invention, there is also provided a tool damage detecting apparatus in a machine tool system having a machining unit for machining a workpiece with a tool detachably mounted thereon and a plurality of tool stockers for storing a plurality of tools and transferring the tools to and from the machining unit, the tool stockers being rotatable to index the tools. The tool damage detecting apparatus comprises a bracket having a plurality of tool approaching members for simultaneously approaching toward at least respective ones of the tools stored in the tool stockers, a plurality of contactless or contact-type detectors mounted respectively on the tool approaching members for detecting damage to the tools, and a moving mechanism for moving the bracket in an axial direction of the tools.

With the above arrangement, the tool damage detecting apparatus can simultaneously detect damage to the tools stored in the tool stockers, and can detect damage to the tools even while the workpiece is being machined by the machining unit. The tool damage detecting apparatus can therefore quickly detect damage to the tools. Since the tool damage detecting apparatus can detect damage to the tools, even while the workpiece is being machined by the machining unit, the machine tool system can be prevented from being shut down. Consequently, the machine tool system has better production efficiency.

The tool approaching members may have a structure for maintaining the tool approaching members out of physical interference with tools having smallest and largest axial lengths among the tools that are stored on the tool stockers, when the tool approaching members are held in a position closest to the tools by the moving mechanism. Therefore, the tool approaching members can be used to detect damage to tools of all lengths that are used.

The detectors may be fixed in respective positions for detecting damage to the tools having the smallest and largest axial lengths among the tools that are stored on the tool stockers, when the tool approaching members are moved from the position closest to the tools to a position remotest from the tools by the moving mechanism. With this arrangement, the detectors reliably detect damage to tools of all lengths that are used.

The tool approaching members may have a structure for maintaining the tool approaching members out of physical interference with the tools that are stored on the tool stockers upon rotation of the tool stockers, when the tool approaching members are held in a position closest to the tools by the moving mechanism. With this arrangement, while damage to a tool is being detected at one of the tool stockers, another tool stocker can be rotated to automatically change tools on the machining unit.

The tool approaching members may be disposed in a position for handling tools that are stored on at least two of the tool stockers, when the tools are indexed to positions closest to each other upon rotation of at least two of the tool stockers. The tool damage detecting apparatus, which is arranged in this manner, can be small in size.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10A is a side elevational view of the tool transfer mechanism shown in FIG. 9;

FIG. 10B is a side elevational view of the tool transfer mechanism, with a hand thereof being lowered from the state shown in FIG. 10A;

FIG. 11A is a plan view of a portion of the tool stocker near a recess;

FIG. 11B is a front elevational view of the portion of the tool stocker near the recess shown in FIG. 11A;

FIG. 11C is a side elevational view of the portion of the tool stocker near the recess shown in FIG. 11A;

FIG. 12A is a plan view of a portion of the tool stocker near a recess;

FIG. 12B is a front elevational view of the portion of the tool stocker near the recess shown in FIG. 12A;

FIG. 12C is a side elevational view of the portion of the tool stocker near the recess shown in FIG. 12A;

FIG. 13A is a plan view of a portion of the tool stocker near a recess;

FIG. 13B is a front elevational view of the portion of the tool stocker near the recess shown in FIG. 13A;

FIG. 13C is a side elevational view of the portion of the tool stocker near the recess shown in FIG. 13A;

FIG. 14A is a plan view of a portion of the tool stocker near a recess;

FIG. 14B is a front elevational view of the portion of the tool stocker near the recess shown in FIG. 14A;

FIG. 14C is a side elevational view of the portion of the tool stocker near the recess shown in FIG. 14A;

FIG. 15A is a plan view of a portion of the tool stocker near a recess;

FIG. 15B is a front elevational view of the portion of the tool stocker near the recess shown in FIG. 15A;

FIG. 15C is a side elevational view of the portion of the tool stocker near the recess shown in FIG. 15A;

FIG. 16A is a plan view of a portion of the tool stocker near a recess;

FIG. 16B is a front elevational view of the portion of the tool stocker near the recess shown in FIG. 16A;

FIG. 16C is a side elevational view of the portion of the tool stocker near the recess shown in FIG. 16A;

FIG. 17A is a plan view of a portion of the tool stocker near a recess;

FIG. 17B is a front elevational view of the portion of the tool stocker near the recess shown in FIG. 17A;

FIG. 17C is a side elevational view of the portion of the tool stocker near the recess shown in FIG. 17A;

FIG. 18A is a plan view of a portion of the tool stocker near a recess;

FIG. 18B is a front elevational view of the portion of the tool stocker near the recess shown in FIG. 18A;

FIG. 18C is a side elevational view of the portion of the tool stocker near the recess shown in FIG. 18A;

FIG. 19A is a plan view of a portion of the tool stocker near a recess;

FIG. 19B is a front elevational view of the portion of the tool stocker near the recess shown in FIG. 19A;

FIG. 19C is a side elevational view of the portion of the tool stocker near the recess shown in FIG. 19A;

FIG. 20A is a plan view of a portion of the tool stocker near a recess;

FIG. 20B is a front elevational view of the portion of the tool stocker near the recess shown in FIG. 20A;

FIG. 20C is a side elevational view of the portion of the tool stocker near the recess shown in FIG. 20A;

FIG. 21A is a plan view of a portion of the tool stocker near the recess;

FIG. 21B is a front elevational view of the portion of the tool stocker near the recess shown in FIG. 21A;

FIG. 21C is a side elevational view of the portion of the tool stocker near the recess shown in FIG. 21A;

FIG. 22 is a schematic view showing a layout of central axes and operational centers of various elements making up the machine tool system;

FIG. 27 is a fragmentary front elevational view showing a layout of tools stored in main stockers, and tool approaching devices of the tool damage detecting apparatus according to the second embodiment;

FIG. 28 is a flowchart of a damage detecting sequence implemented in the tool damage detecting apparatus according to the second embodiment;

FIG. 29A is a plan view showing the manner in which the tool approaching devices of the tool damage detecting apparatus according to the second embodiment are moved toward the tools;

FIG. 29B is a plan view showing the manner in which the tool approaching devices of the tool damage detecting apparatus according to the second embodiment are moved away from the tools;

FIG. 32 is a front elevational view showing an arrangement incorporating a tool damage detecting apparatus according to a third modification; and FIG. 33 is a front elevational view showing an arrangement incorporating a tool damage detecting apparatus according to a fourth modification.

DESCRIPTION OF THE PREFERRED EMBODIMENTS

Figure 1:
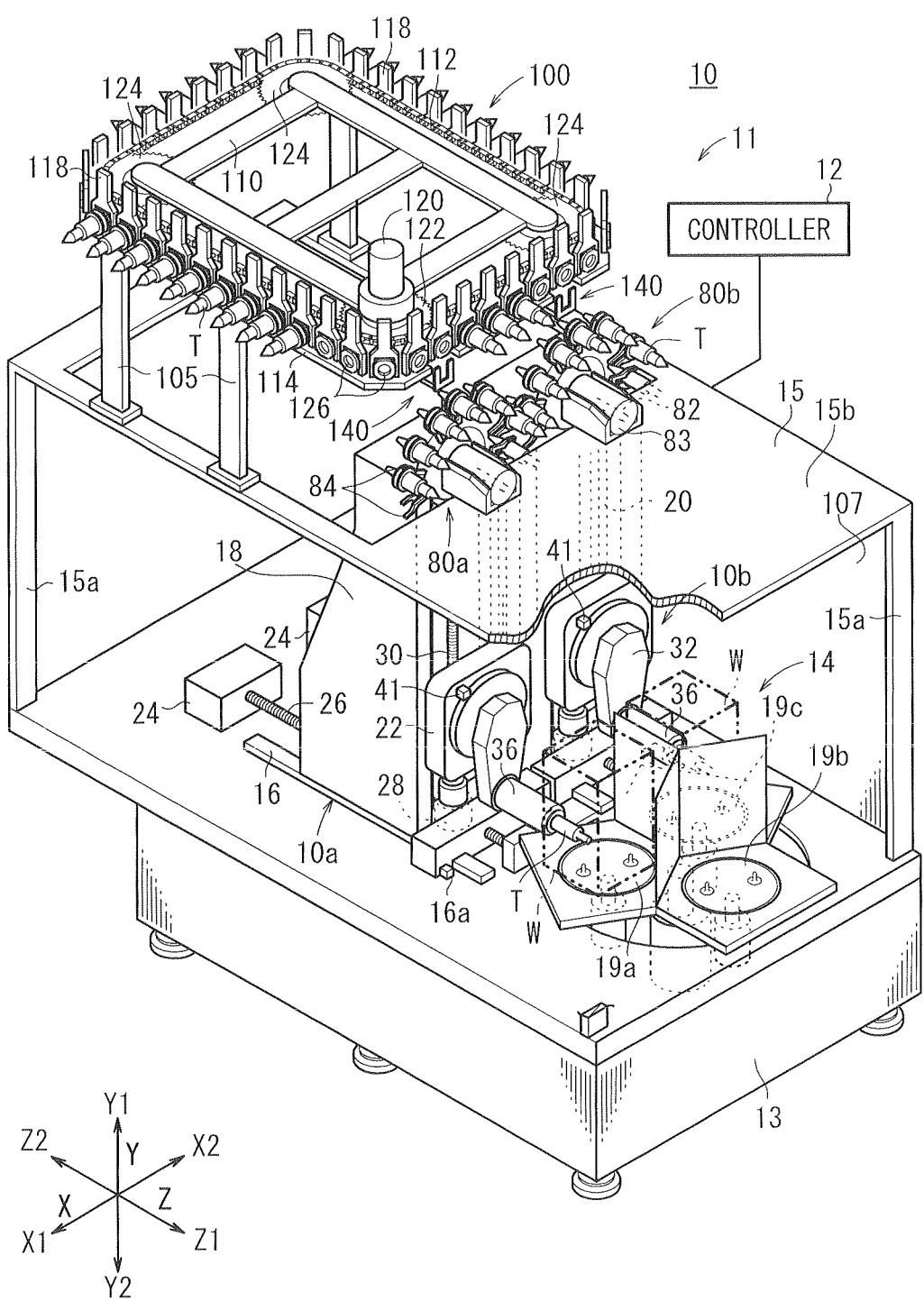
FIG. 1 is a perspective view, partially cut away, of a machine tool system incorporating therein a tool stocker according to a first embodiment of the present invention.

Like or corresponding parts are denoted by like or corresponding reference characters throughout the views.

Tool stockers according to preferred embodiments of the present invention will be described below in connection with machine tool systems incorporating such tool stockers therein, together with tool damage detecting apparatus for use in machine tool systems, with reference to the accompanying drawings.

Initially, a first embodiment of the present invention will be described below.

Figure 2:
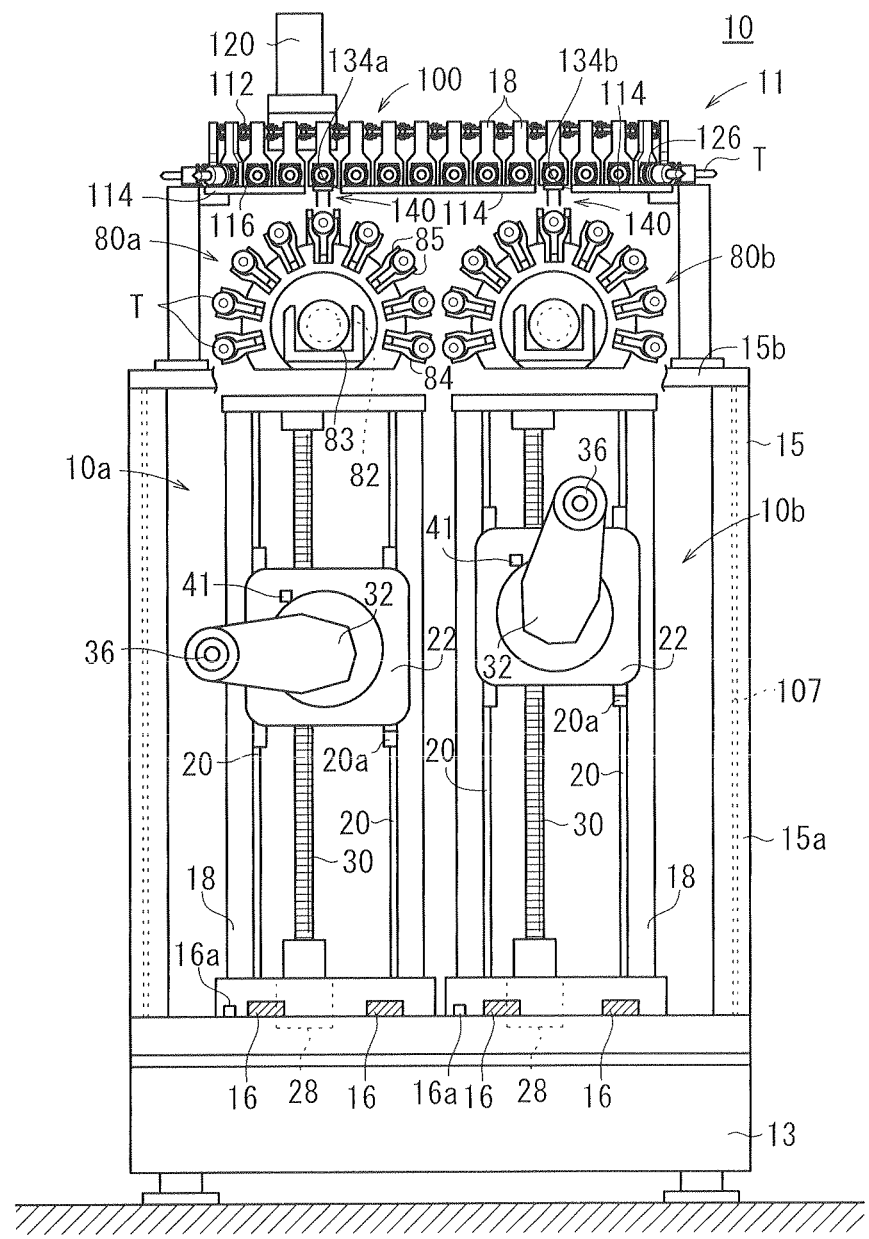
FIG. 2 is a front elevational view of the machine tool system shown in FIG. 1.
Figure 3:
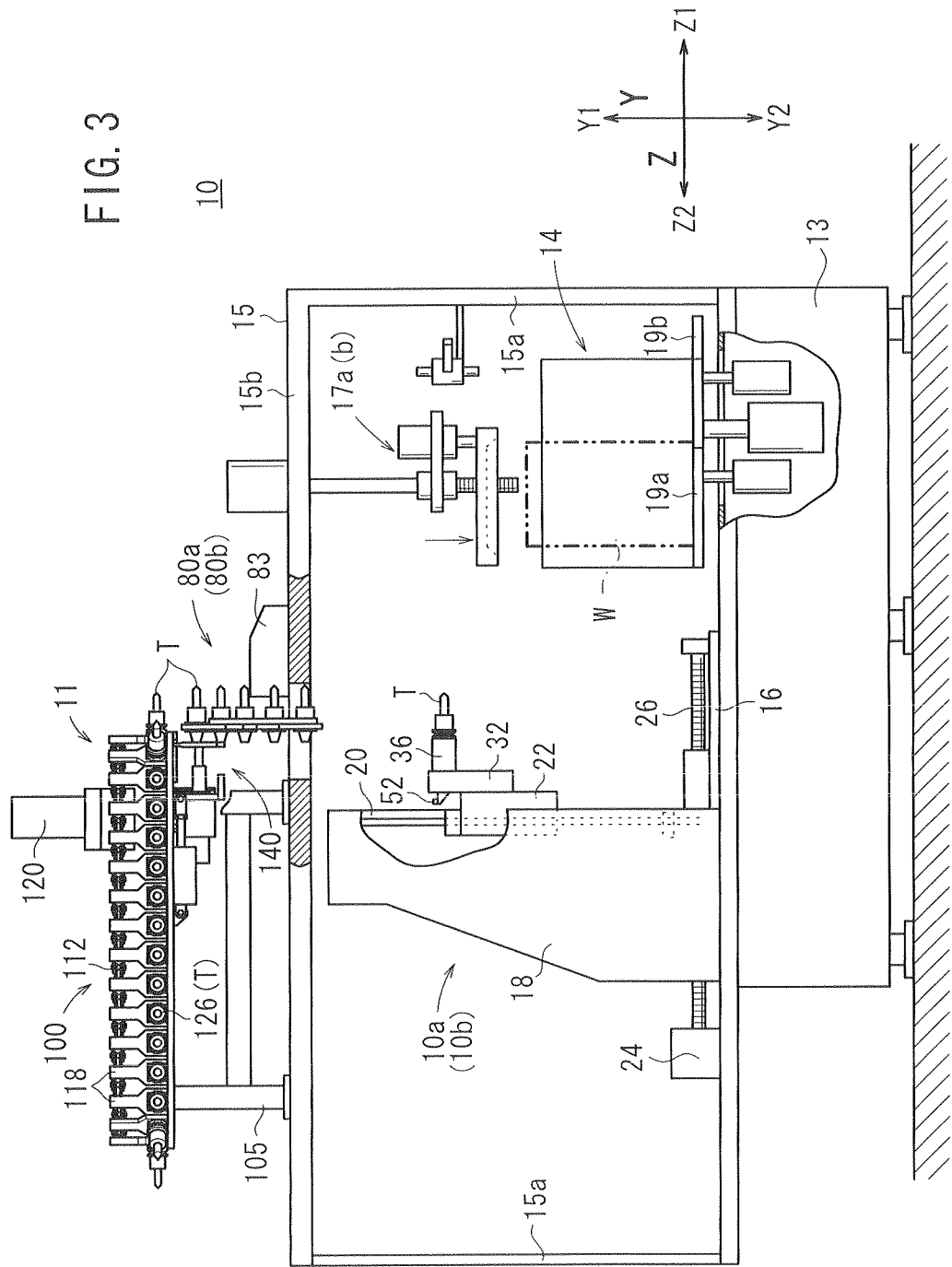
FIG. 3 is a side elevational view of the machine tool system shown in FIG. 1.

FIG. 1 is a perspective view, partially cut away, of a machine tool system 10 incorporating a tool stocker 11 therein according to the first embodiment. FIG. 2 is a front elevational view of the machine tool system 10 shown in FIG. 1, and FIG. 3 is a side elevational view of the machine tool system 10 shown in FIG. 1. The machine tool system 10 operates to machine workpieces W by drilling, boring, honing, etc. In order to define respective orientations of the machine tool system 10, the horizontal directions in FIG. 2 are referred to as X directions (X1, X2 directions), the vertical directions as Y directions (Y1, Y2 directions), and the depthwise directions perpendicular to the X and Y directions as Z directions (Z1, Z2 directions) (see FIG. 3). The X and Y directions refer to respective directions in a plane, which are perpendicular to each other.

The machine tool system 10 comprises a first machine tool 10a disposed on the left side (X1 direction side) in the front elevational view of FIG. 2, a second machine tool 10b disposed on the right side (X2 direction side), a controller 12 for controlling the first machine tool 10a and the second machine tool 10b in a consolidated and coordinated manner, and a tool stocker 11 that holds a plurality of detachable tools T. The first machine tool 10a and the second machine tool 10b are disposed parallel to each other, and share a common base plate 13, a workpiece moving device 14, and a frame 15. However, each of the first and second machine tools 10a and 10b may alternatively have a dedicated base plate 13, a workpiece moving device 14, and a frame 15 associated therewith. In the present embodiment, since the first machine tool 10a and the second machine tool 10b are structurally identical to each other, the first machine tool 10a primarily will be described below.

The first machine tool 10a has as its base the base plate 13, which is fixed to the floor. The base plate 13 is narrow in the X directions and low in the Y directions. The workpiece moving device 14 and the frame 15 are mounted on an upper surface of the base plate 13.

Figure 5:
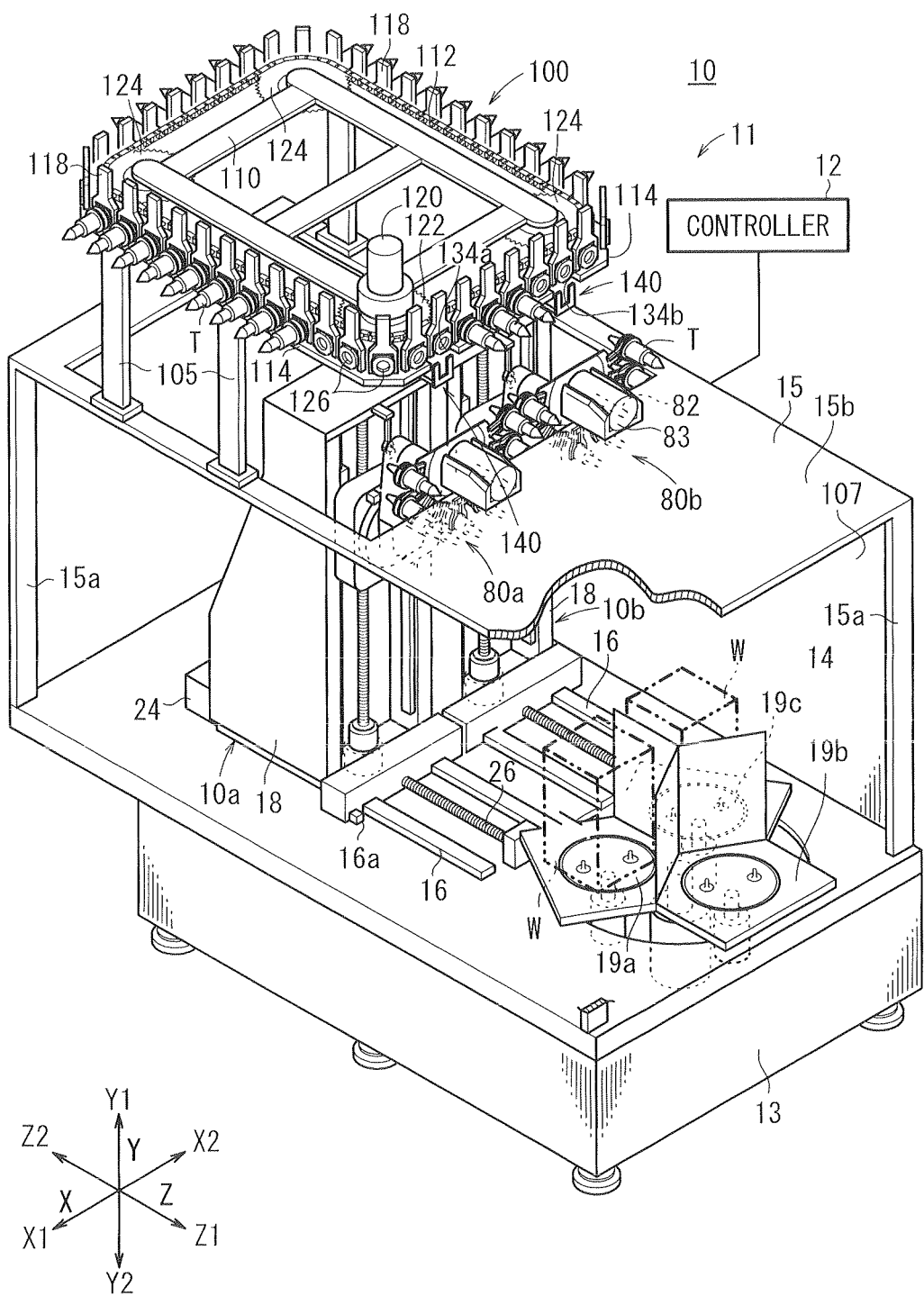
FIG. 5 is a perspective view, partially cut away, showing the manner in which tools are changed by a main stocker in the machine tool system shown in FIG. 1.

The workpiece moving device 14 includes respective workpiece tables 19a, 19b, 19c disposed over a portion of the upper surface of the base plate 13, near to the front end of the machine tool system 10 in the Z1 direction. Workpiece pressing and fixing devices 17a, 17b (see FIG. 3) for downwardly pressing and fixing the workpieces W placed on the workpiece tables 19a, 19b, 19c are disposed above the workpiece moving device 14. In the present embodiment, the workpiece tables 19a, 19b, 19c comprise rotary tables spaced from each other at angular intervals of 120°. In FIGS. 1, 2, and 5, the workpiece pressing and fixing devices 17a, 17b have been omitted from illustration in order to make the support body 22 and the turn arm 32, etc., visible.

As shown in FIG. 1, the frame 15 supports thereon the tool stocker 11 that stores a plurality of tools T. The tool stocker 11 comprises a pair of main stockers (first tool stockers) 80a, 80b associated respectively with the first machine tool 10a and the second machine tool 10b, and an auxiliary stocker (second tool stocker) 100 disposed upwardly and rearwardly of the main stockers 80a, 80b in the Z2 direction.

The frame 15 comprises four support posts 15a extending upwardly from opposite ends of the base plate 13, which are spaced apart from each other in the Z directions, and a plate 15b supported on upper ends of the support posts 15a. The auxiliary stocker 100 is supported by legs 105 on an end portion of the plate 15b in the Z2 direction, and has a rectangular shape, which also is slightly elliptical in shape, i.e., having rounded corners, and which is elongated in the Z-axis direction. The four support posts 15a comprise two sets of two support posts 15a each, which are spaced apart from each other in the Z directions, and shutters 107 are disposed between the two support posts 15a that make up the respective sets. The shutters 107 serve to prevent chips and machining oil from being scattered laterally outside of the machine tool system 10 while the workpiece W is being machined. The shutters 107 may be opened when the main spindles 36 used for machining workpieces W with tools T are serviced for maintenance.

The first machine tool 10a comprises a pair of Z rails 16 disposed on the upper surface of the base plate 13 and extending in the Z-axis direction, a column 18 slidable in the Z-axis direction while being guided by the Z rails 16, a pair of Y rails 20 disposed on a front surface of the column 18 and extending in the Y-axis direction, and a support body 22 slidable in the Y-axis direction while being guided by the Y rails 20 (see FIG. 2). The column 18, which is slidable on the Z rails 16, has a position in the Z-axis direction that is detectable by a Z-position sensor 16a. Similarly, the support body 22, which is slidable on the Y rails 20, has a position in the Y-axis direction that is detectable by a Y-position sensor 20a. The detected positions of the column 18 and the support body 22 are supplied to the controller 12.

The column 18 is movable back and forth in the Z directions by means of a ball screw mechanism 26, which is connected to a Z motor 24 disposed behind the base plate 13 (see FIG. 3). The Z motor 24 may be combined with a rotary encoder, not shown, which detects the rotational angle of the ball screw of the ball screw mechanism 26. The detected rotational angle may be supplied from the rotary encoder to the controller 12 as representing the position in the Z-axis direction of the column 18.

The support body 22 is movable back and forth in the Y directions by a ball screw mechanism 30, which is connected to a Y motor 28 disposed in the base plate 13 (see FIG. 2). The Y motor 28 may be combined with a rotary encoder, not shown, which detects the rotational angle of the ball screw of the ball screw mechanism 30. The detected rotational angle may be supplied from the rotary encoder to the controller 12 as representing the position in the Y-axis direction of the support body 22. The column 18 and the Y rails 20 are elongated in the Y-axis direction for thereby allowing the support body 22 to move a relatively long distance in the Y directions.

Figure 4:
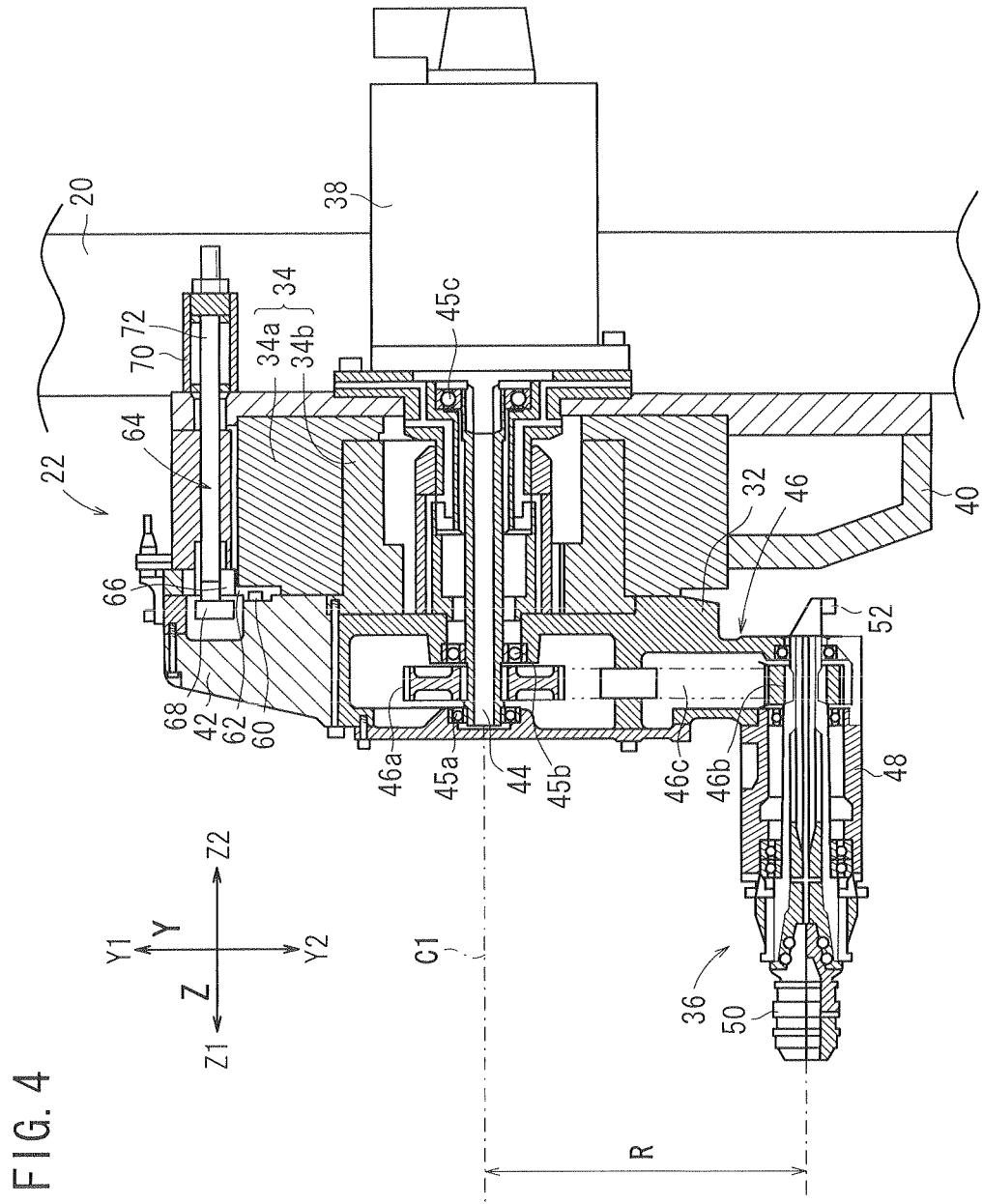
FIG. 4 is a sectional side elevational view of a support body and main spindle of the machine tool system shown in FIG. 1.

As shown in FIG. 4, the support body 22 comprises a turn arm 32, which turns (rotates) about its own axis in a vertical plane (XY plane) facing the workpiece W, and which is spaced from the support body 22 in the Z1 direction, an arm motor 34 for turning the turn arm 32, a main spindle 36 rotatably supported on the turn arm 32 and oriented in the Z1 direction, and a spindle motor 38 for rotating the main spindle 36 about its own axis. The arm motor 34 comprises a direct drive motor, for example. The support body 22 includes a frame 40 serving as a base, and which houses the arm motor 34 therein. The arm motor 34 comprises a stator 34a fixedly disposed in the frame 40, and a hollow rotor 34b disposed in the stator 34a.

The turn arm 32 is fixed to an end of the rotor 34b in the Z1 direction, and is turned by the arm motor 34 when the arm motor 34 is energized. The angle of the turn arm 32 with respect to the support body 22 is measured by an angle sensor 41 (see FIG. 1) and is supplied to the controller 12. Although the turn arm 32 can be turned (rotated) endlessly as shown in FIG. 4, the turn arm 32 should be capable of turning at least one revolution (through 360°). The main spindle 36 is spaced a distance R from the axis (turning center) C1 about which the turn arm 32 is turned.

A balancer 42 is disposed on one side (upper side in FIG. 4) of the turn arm 32, which is diagonally opposite to the main spindle 36. The balancer 42 comprises a liquid tank containing a liquid such as a coolant or the like, which is capable of keeping the turn arm 32 in balance by changing the amount of liquid therein depending on a tool that is mounted on the main spindle 36. The balancer 42 may alternatively comprise a metal weight. The turn arm 32, except for the balancer 42, comprises a hollow internal structure. The turn arm 32 is considerably light in weight compared to the support body 22, and the turn arm 32 does not impair the stability of the support body 22 and the first machine tool 10a when the turn arm 32 is turned.

A rear portion of the spindle motor 38 projects from the frame 40 in the Z2 direction and is fixed to a rear surface of the frame 40 of the support body 22 in coaxial alignment with the arm motor 34. Since the spindle motor 38 and the arm motor 34 are coaxial with each other (i.e., the axis C1 about which the turn arm 32 is turned and the axis (rotational center) about which the rotatable shaft of the spindle motor 38 is rotated are coaxial with each other), the support body 22 is constructed as a compact unit. Further, since the spindle motor 38 is not coaxial with the axis of the main spindle 36, but rather is located at the center of the turn arm 32, the balancer 42 may be reduced in mass and size, thereby allowing the support body 22 to be compact as a whole.

A shaft 44 extends through a hollow region of the rotor 34b and has one end thereof fixed to the rotatable shaft of the spindle motor 38, and another end thereof projecting from the frame 40 toward an end plate of the turn arm 32 in the Z1 direction. The shaft 44 is rotatably supported by respective bearings 45a, 45b, 45c at the end of the turn arm 32 in the Z1 direction, the end of the turn arm 32 in the Z2 direction, and at an end of the frame 40 in the Z2 direction.

A pulley mechanism 46 comprises a drive pulley 46a fixedly mounted on the shaft 44 between the bearings 45a, 45b, a driven pulley 46b fixedly mounted on an end of the main spindle 36 in the Z2 direction, and an endless belt 46c trained around the drive pulley 46a and the driven pulley 46b. The pulley mechanism 46, which is made up of the pulleys and the endless belt, is advantageous in that the pulley mechanism 46 allows the turn arm 32 to be lightweight. The pulley mechanism 46 may be replaced with a drive transmission mechanism, which includes a gear in place of the drive pulley 46a, a pinion in place of the driven pulley 46b, and a silent chain in place of the endless belt 46c. A plurality of gears may be used instead of a silent chain disposed in driving engagement between the gear and the pinion, for thereby transmitting drive power from the spindle motor 38 to the main spindle 36.

The pulley mechanism 46 is disposed in a hollow region of the turn arm 32. The endless belt 46c is adjusted in tension by a tension mechanism, not shown. Rotation of the spindle motor 38 is transmitted to the main spindle 36 by the shaft 44 and the pulley mechanism 46.

The main spindle 36 is housed in a main spindle cover 48, which is integrally coupled to the turn arm 32. A tool head 50 for supporting a tool T therein is disposed on a tip end of the main spindle 36 in the Z1 direction. An unclamping lever 52 for unclamping the tool T from the tool head 50 in order to release the tool T is disposed on an end of the main spindle 36 in the Z2 direction. The unclamping lever 52 is of a shape that projects slightly outward away from the axis C1. When the unclamping lever 52 is pressed toward the axis C1 by an unclamping block 53 (see FIG. 6), the unclamping lever 52 is moved in order to unclamp the tool T from the main spindle 36. When the unclamping block 53 is displaced away from the unclamping lever 52, the unclamping lever 52 is returned to its original position by a resilient member, not shown, thereby clamping a tool T in the tool head 50. Alternatively, an electric mechanism for clamping and unclamping a tool T may be incorporated into the main spindle 36.

A fixing device 64 is mounted on a rear surface of the turn arm 32, which faces in the Z2 direction, for fixing the turn arm 32 in a given position by gripping a disk 62, which comprises a leaf spring or the like, with a screw 60. The fixing device 64 comprises a seat 66, which is held against the rear surface of the disk 62, and a presser 68 for gripping the disk 62 between the presser 68 and the seat 66. The presser 68 is mounted on the distal end of a rod 72, which is urged by a disk spring 70 in a direction to grip the disk 62. When the rod 72 is pressed forward against the disk spring 70, the disk 62 becomes released, thus allowing the turn arm 32 to turn. In the present embodiment, since the disk 62 comprises a leaf spring, the turn arm 32 does not fall over while the disk 62 is gripped, and the turn arm 32 is reliably prevented from being turned.

As shown in FIG. 1, the main stocker 80a, which is associated with the first machine tool 10a and stores a plurality of tools T that can be detachably mounted on the main spindle 36, is positioned over a left portion, which extends in the X1 direction, of the upper surface of the plate 15b. The main stocker 80b, which is associated with the second machine tool 10b and has a mechanism identical to the main stocker 80a, is positioned over a right portion, which extends in the X2 direction, of the upper surface of the plate 15b. The main stocker 80a primarily will be described below.

Figure 6:
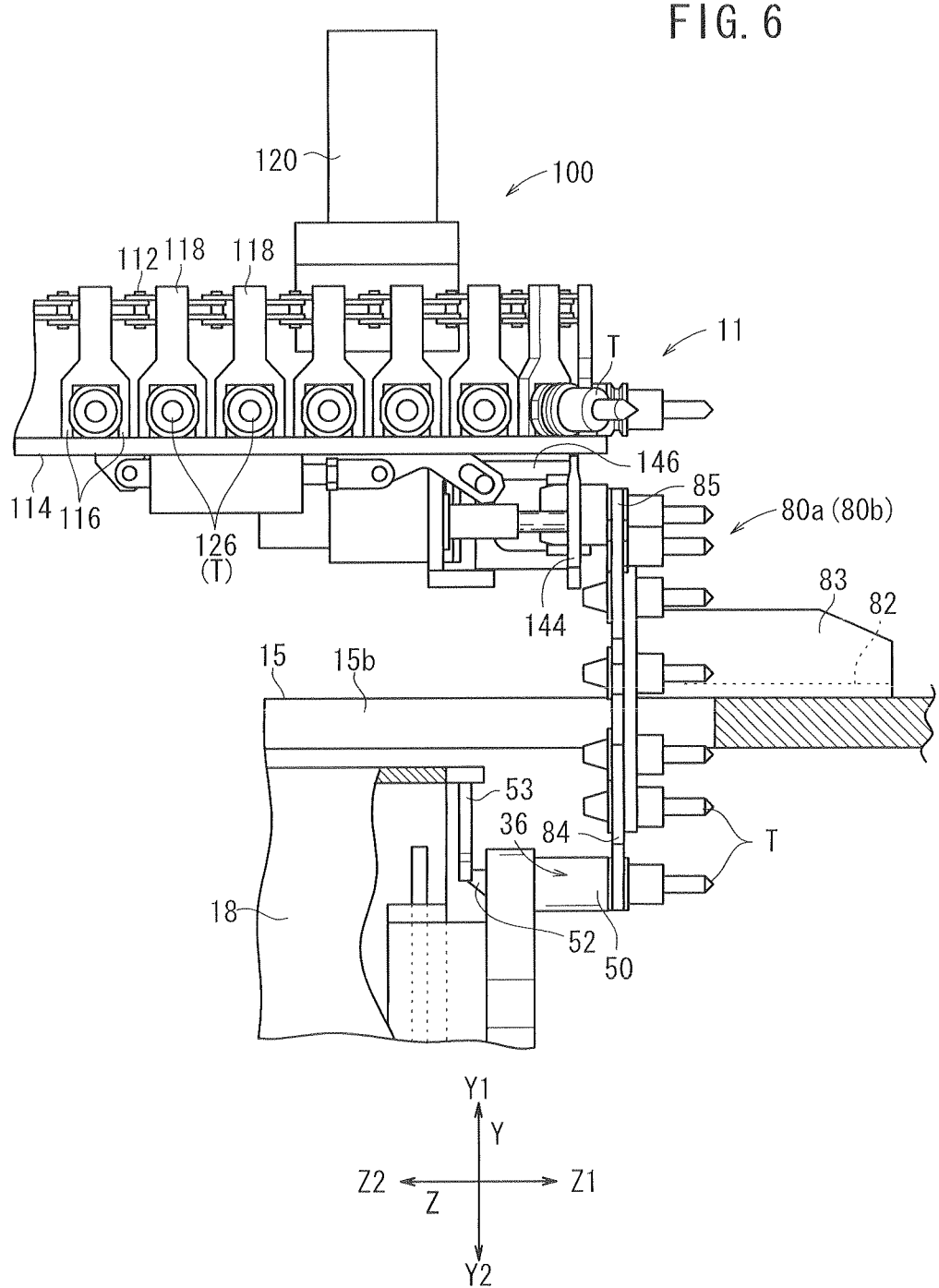
FIG. 6 is an enlarged side elevational view of a column, the main stocker, and nearby parts at a time when the tools are changed, as shown in FIG. 5.

As shown in FIGS. 1 and 6, the main stocker 80a is in the form of a rotatable magazine, which comprises a rotatable shaft 82 extending in the Z-axis direction, a magazine motor 83 for rotating the rotatable shaft 82 about its own axis, and a plurality of holding arms 84 that extend radially outwardly around the rotatable shaft 82, and which are angularly spaced in an angular range of about 270° as viewed in front elevation (see FIG. 2). Each of the holding arms 84 includes a substantially C-shaped grip (first holder) 85 on a distal end thereof for gripping a tool T. The grip 85 comprises a resilient member, which can resiliently be spread in order to allow a tool T to be inserted therein when the tool T is pushed into the grip 85 through an opening of the C-shaped grip 85, and which can grip and hold the tool T after the tool T has been inserted into the grip 85. The tool T, which is gripped by the grip 85, can forcibly be pulled out through the opening of the C-shaped grip 85. The main stocker 80a may consist of about 16 holding arms 84. Each of the grips 85 can directly grip the tool T through an annular groove defined in the tool T, without requiring a tool pod 126, described later, to be interposed therebetween.

The main stocker 80a has a portion which is free of the holding arms 84, and which extends within an angular range of about 90°, which is other than the angular range of about 270° in which the holding arms 84 are angularly spaced. When the workpiece W is machined, or when the main stocker 80a is not in use, the portion of the main stocker 80a that is free of the holding arms 84 is oriented downwardly (see FIG. 2). At this time, since the main stocker 80a is disposed entirely above the plate 15b, the main stocker 80a does not obstruct the column 18 and the support body 22 while they operate. When a given tool T on the main spindle 36 is replaced, the main stocker 80a is turned to orient a desired holding arm 84 downwardly from the end of the plate 15b (see FIG. 5).

More specifically, an idle holding arm 84, which is free of a tool T, is oriented downwardly. After the position of the column 18 in the Z-axis direction has been adjusted, the support body 22 is elevated. As shown in FIG. 6, the tool T is held by the holding arm 84, and the unclamping lever 52 is hit and actuated by the unclamping block 53, which extends downwardly from the upper end of the column 18, thereby unclamping the tool T from the tool head 50. Then, the column 18 is retracted in the Z2 direction in order to pull the tool T out of the tool head 50.

The main stocker 80a is turned so as to orient the holding arm 84, which holds the tool T to be used, and then the column 18 is moved in the Z1 direction. At this time, the tool T is inserted into the tool head 50. The support body 22 is lowered to space the unclamping lever 52 from the unclamping block 53, whereupon the tool T becomes clamped in the tool head 50. Thereafter, the main stocker 80a is turned to position all of the holding arms 84 above the plate 15b, as shown in FIG. 2.

Since no mechanism is disposed between the main stocker 80a and the main spindle 36 for transferring tools T, and since each of the holding arms 84 directly grips a tool T, tools T can directly be mounted in and removed from the tool head 50 by means of operating the column 18, the support body 22, and the turn arm 32. Inasmuch as no dedicated mounting and detaching mechanism is required, the main stocker 80a is simple in structure, and the time required to mount and detach tools T is short.

As shown in FIGS. 1 through 3, the auxiliary stocker 100 is displaced from the main stockers 80a, 80b in the Z2 direction, and is supported by the legs 105 that are erected on the plate 15b. The auxiliary stocker 100 supports tools T above the holding arms 84 of the main stockers 80a, 80b. The auxiliary stocker 100 is positioned astride the main stockers 80a, 80b, as viewed in front elevation in FIG. 2. The auxiliary stocker 100, which is in the form of a rotatable magazine having a rectangular shape similar to an elliptical shape (i.e., having rounded corners), is capable of simultaneously servicing the main stockers 80a, 80b. The auxiliary stocker 100 is rotatable in a horizontal plane (XZ plane) for indexing the tools T.

The auxiliary stocker 100 comprises a substantially rectangular base frame 110 fixed to the legs 105, a movable chain 112 that extends around an outer circumferential edge of the base frame 110, and a rail (tool moving rail) 114 disposed beneath the chain 112 in the Y2 direction, and which extends parallel to the chain 112 around the outer circumferential edge of the base frame 110.

The chain 112 has a substantially rectangular shape with four arcuate (rounded) corners. One of the four arcuate corners of the chain 112 has an inner side, which is held in mesh with a drive gear 122 actuated by a motor (drive source) 120, whereas the remaining three arcuate corners have inner sides held in mesh with driven gears 124. Therefore, the chain 112 is movable in a circulating fashion along the outer circumferential edge of the base frame 110.

A plurality of juxtaposed holding arms 118 are fixed to the chain 112 at given intervals along the chain 112. The holding arms 118 are substantially Y-shaped, and are somewhat similar in shape to the holding arms 84. However, the holding arms 118 indirectly hold the tools T mounted in respective tool pods 126 by engagement with the tool pods 126.

Figure 8:
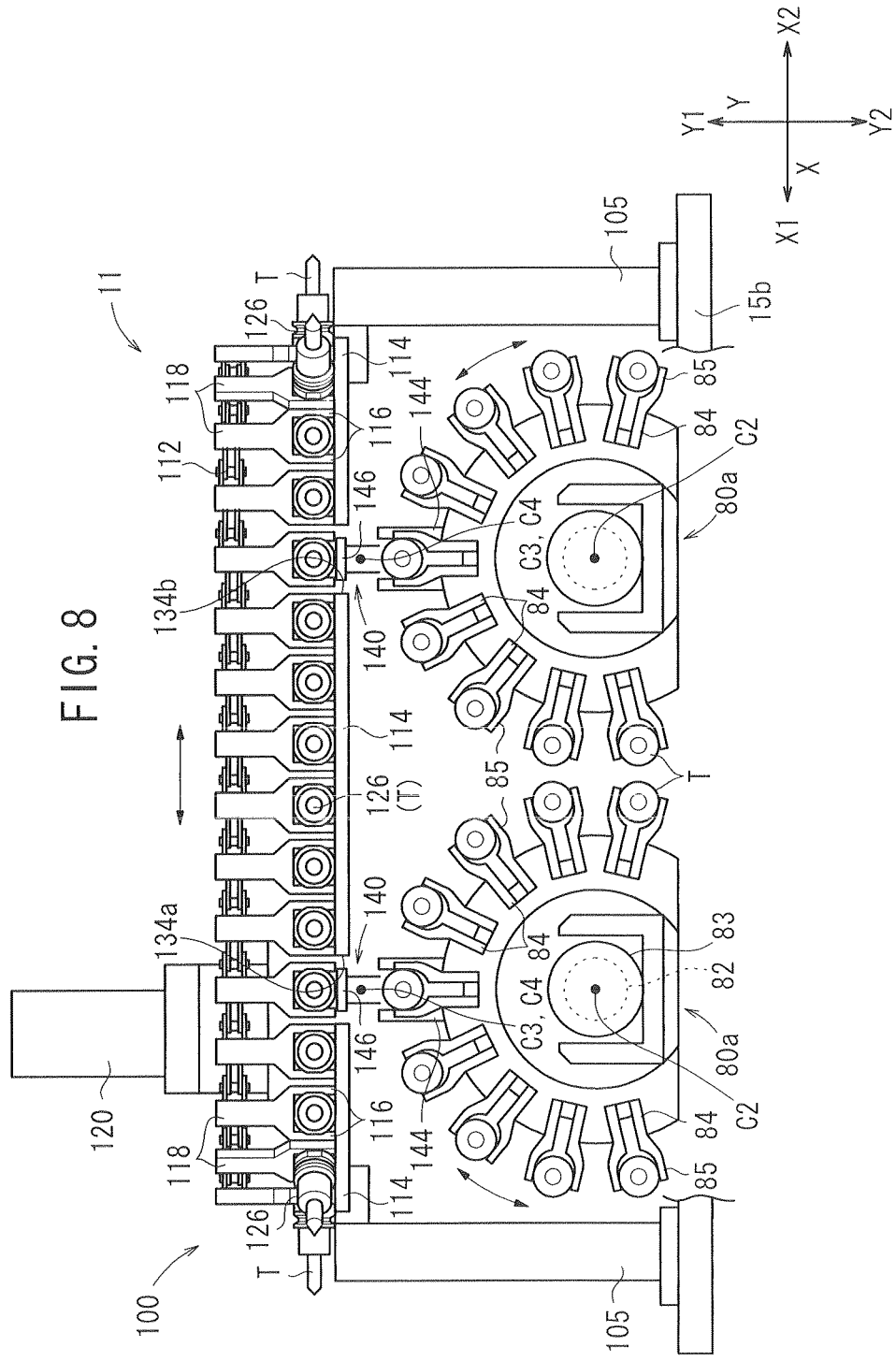
FIG. 8 is an enlarged front elevational view of a tool stocker according to the first embodiment.

Each of the holding arms 118 has a narrow bar-shaped portion terminating in an end and fixed to the chain 112, and a fork (second holder) 116 terminating in an opposite end and extending downwardly in the Y2 direction, so that each of the holding arms 118 opens in a downward direction (see FIGS. 1 and 8). Unlike the grips 85 of the holding arms 84, the fork 116 comprises a bifurcated member, which does not include a resilient mechanism or a movable portion. Each of the holding arms 118 holds a tool pod 126 (tool T) inserted into the fork 116 by surrounding the tool pod 126 (tool T) with the fork 116 and the rail 114. The auxiliary stocker 100 can thus store a plurality of tools T. The auxiliary stocker 100 may comprise approximately 80 holding arms 118, for example. The rail 114 may have a movable portion on the rear side of the machine tool system 10 in the Z2 direction, for example. The movable portion may manually be operated by the operator in order to replace tool pods 126 and tools T supported by the holding arms 84.

The drive gear 122, which is actuatable by the motor 120, the chain 112, and the driven gears 124 jointly make up a moving mechanism, which causes the holding arms 118 to move the tool pods 126 (tools T) in sliding engagement with the rail 114. The chain 112 and the gears 122, 124 may be replaced with a belt and pulleys, respectively, thereby making up a belt and pulley mechanism for moving the tool pods 126 (tools T). Further, a linear motor may be used as a drive source in place of the motor 120. Therefore, any of various moving mechanisms may be employed, insofar as such mechanisms can smoothly move the holding arms 118.

Figure 7:
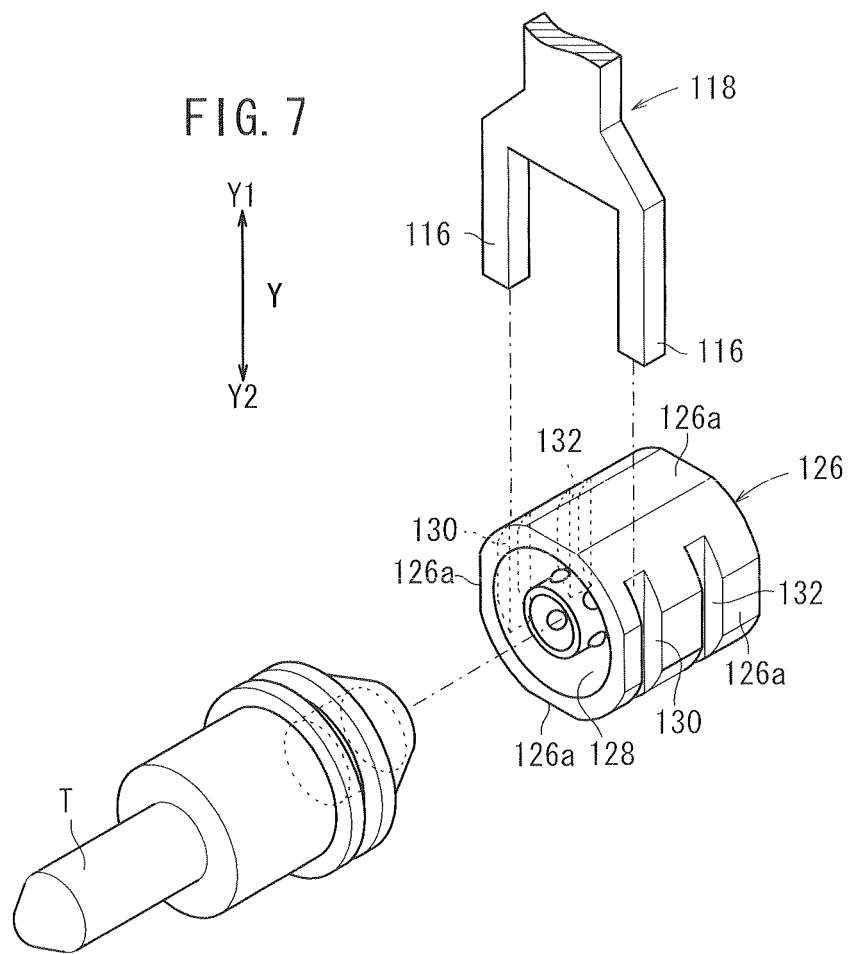
FIG. 7 is a perspective view of a tool pod.

As shown in FIG. 7, each of the tool pods 126 comprises a substantially hollow cylindrical receptacle having axially extending upper, lower, left, and right flat facets 126a on the outer circumferential surface thereof in an attitude held by the fork 116. The tool pod 126 has a mount hole 128 defined in a front end thereof for removably holding a tool T. Each of the left and right flat facets 126a has a pair of axially spaced slots 130, 132 defined therein, which extend in Y directions perpendicular to the axis of the tool pod 126.

As shown in FIGS. 6 and 7, when the fork 116 of the holding arm 118 is inserted into the slots 130 in the Y2 direction, the holding arm 118 holds the upper facet 126a and the left and right sides of the tool pod 126. When the lower facet 126a is held against the rail 114, the tool pod 126 (tool T) as a whole is reliably held in position. Thereafter, the chain 112 is actuated in a circulating manner by the motor 120, so as to move the tool pod 126 (tool T) engaged by the fork 116 in unison with the chain 112, while the lower facet 126a slides against the rail 114. The rail 114 should preferably be made of a material that allows the tool pod 126 to slide smoothly thereon, for example, a resin material such as Nylon (polyamide), fluororesin, or the like.

As shown in FIGS. 2 and 8, the rail 114 held in sliding contact with the tool pods 126 has a pair of recesses 134a, 134b defined in an edge thereof, which faces in the Z1 direction, whereas the recesses 134a, 134b are positioned in vertical alignment with the main stockers 80a, 80b, respectively.

As shown in FIG. 8, the recesses 134a, 134b are aligned with the rotatable shafts 82, respectively, of the main stockers 80a, 80b in the Y directions. More specifically, the axes (rotational centers) C2 about which the main stockers 80a, 80b rotate, and the central positions C4 of the recesses 134a, 134b in the transverse directions (X directions), are aligned with each other in the Y-axis direction. Since the recesses 134a, 134b and the rotational shafts 82 are oriented in the same vertical plane (YZ plane in FIG. 22), when holding arms 84 of the main stockers 80a, 80b are indexed to their highest positions in the Y-axis direction, the holding arms 84 are placed in vertical alignment with the recesses 134a, 134b. Then, when holding arms 118 of the auxiliary stocker 100 are indexed to positions aligned with the recesses 134a, 134b, the holding arms 118 are disposed in a facing relation with respect to the holding arms 84 in the highest positions in the Y-axis direction, with the recesses 134a, 134b interposed therebetween.

The tool stocker 11 according to the present embodiment, therefore, is capable of holding the openings of the grips 85 and the forks 116 of the indexed holding arms 84, 118 in facing relation to each other vertically in the Y-axis direction, as viewed in front elevation in FIG. 8.

The tool stocker 11 includes a pair of tool transfer mechanisms (tool changers) 140 associated with the respective recesses 134a, 134b, i.e., having operational centers C3 aligned with the central positions C4 of the recesses 134a, 134b in the Y-axis direction. For the sake of brevity, the central positions C4 of the recesses 134a, 134b are shown as being slightly lowered in FIG. 8. Actually, however, the central positions C4 of the recesses 134a, 134b are at the same height as the rail 114. When the tool transfer mechanisms 140 are actuated while the openings of the grips 85 and the forks 116 face toward each other, the tool transfer mechanisms 140 can easily and stably transfer tools T between the main stockers 80a, 80b, and the auxiliary stocker 100.

Figure 9:
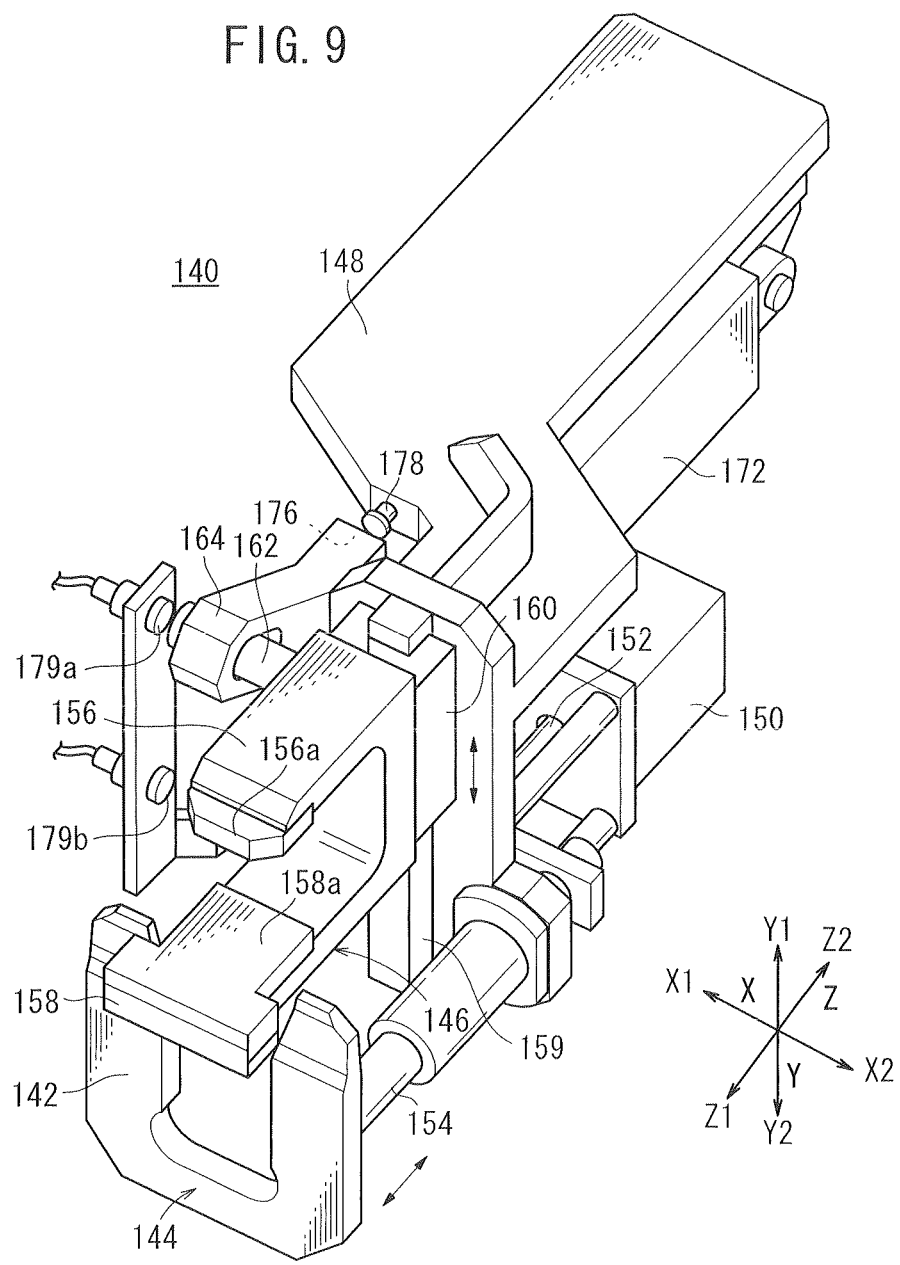
FIG. 9 is a perspective view of a tool transfer mechanism shown in FIG. 8.

FIG. 9 shows one of the tool transfer mechanisms 140 in perspective. FIG. 10A shows in side elevation the tool transfer mechanism 140 illustrated in FIG. 9, and FIG. 10B shows in side elevation the tool transfer mechanism 140, with a hand 146 thereof being lowered from the state shown in FIG. 10A. FIGS. 9, 10A, and 10B show the tool transfer mechanism 140, which is associated with the main stocker 80b and the recess 134b. The other tool transfer mechanism 140 that is associated with the other main stocker 80a and the other recess 134a basically is identical to the tool transfer mechanism 140 shown in FIGS. 9, 10A, and 10B, except for being essentially symmetrical in structure, and hence the other tool transfer mechanism 140 will not be described in detail below.

As shown in FIGS. 9, 10A, and 10B, the tool transfer mechanism 140 comprises an engaging member (second moving member) 144, which is substantially U-shaped as viewed in front elevation, and which extends upwardly in the Y1 direction. The engaging member 144 has a pair of fingers 142 for engaging in the respective slots 132 of a tool pod 126, and a hand (first moving member) 146, which is substantially C-shaped as viewed in side elevation, disposed between the fingers 142. The engaging member 144 and the hand 146 are supported by a frame 148.

The engaging member 144 is movable back and forth in the Z directions by a pair of guide rods 154 connected to a rod 152 of a cylinder mechanism 150, which also is movable back and forth in the Z directions.

The hand 146 has a substantially C-shaped structure including an upper plate 156 extending parallel to a horizontal plane (XY plane), and a lower plate 158 extending parallel to and spaced from the upper plate 156 in the Y2 direction. The lower plate 158 projects more than the upper plate 156 in the Z1 direction. The spacing between the upper plate 156 and the lower plate 158 is set to a predetermined distance, which is large enough for a tool pod 126 moved by a holding arm 118 to be inserted between the upper plate 156 and the lower plate 158 in the X-axis direction (see FIG. 10A).

Slide members 156a, 158a are mounted respectively on inner surfaces of the upper plate 156 and the lower plate 158. The slide members 156a, 158a are made of a material that allows the tool pod 126 to slide smoothly thereon, as with the rail 114. For example, the slide members 156a, 158a are made of a resin material such as Nylon (polyamide), fluororesin, or the like, or a metal material such as a copper alloy, an aluminum alloy, or the like. A slider 160 is fixed to the rear surface of a joint that interconnects the upper plate 156 and the lower plate 158 to each other, and which extends vertically in the Y-axis direction. The slider 160 is held in vertically movable engagement with a rail 159 that is fixed to the frame 148, and also extends in the Y-axis direction.

A shaft 162 extending in the X1 direction projects from a side of the hand 146, which faces in the X1 direction, as shown in FIG. 9. A link 164, which has a bent shape as viewed in side elevation in FIG. 10A, is disposed near the side of the hand 146. The link 164 is pivotally supported on a hinge pin 166 and projects from the frame 148, and is inserted in a through hole defined in a substantially central bend of the link 164. The link 164 has an oblong hole 168 defined in one end thereof, which receives the shaft 162 that projects from the side of the hand 146. A pin 170 projects in the X1 direction from an opposite end of the link 164. The pin 170 is supported in a through hole defined in a lever 175 mounted on the distal end of a rod 174, and which is movable back and forth in the Z directions by a cylinder mechanism 172. A stop 176 is mounted on the rear surface of the bend of the link 164, which faces in the Z2 direction, and is engageable by a stop bolt 178 that projects from the frame 148.

When the cylinder mechanism 172 is actuated to move the lever 175 in the Z2 direction, the link 164 is swung about the hinge pin 166 in order to cause the shaft 162 to move vertically in the Y directions within the oblong hole 168, thereby moving the hand 146 in the Y directions while the slider 160 moves along the rail 159. Specifically, when the rod 174 extends in the Z1 direction, as shown in FIG. 10A, the link 164 is turned upwardly, thereby lifting the hand 146 in the Y1 direction. When the rod 174 is retracted in the Z2 direction from the position shown in FIG. 10A, the link 164 is turned downwardly in the direction indicated by the arrow θ, as shown in FIG. 10B, thereby lowering the hand 146 in the Y2 direction. Upper and lower limit positions (positions in the Y directions), which are reached by the shaft 162 and hence the hand 164 as the link 164 is turned, are detected by sensors (proximity sensors) 179a, 179b, which are installed in respective upper and lower limit positions. The hand 146 reaches its upper limit position when the stop 176 and the stop bolt 178 abut against each other, whereas the hand 146 reaches its lower limit position when the rod 174 is fully retracted by the cylinder mechanism 172.

The tool transfer mechanism 140 is installed in a position such that when the hand 146 is in the upper limit position in the Y1 direction, the upper surface (the slide member 158a) of the lower plate 158 of the hand 146 lies substantially flush with the rail 114, and the frame 148 is fixedly suspended from the lower surface of the base frame 110, which faces in the Y2 direction (see FIGS. 3, 6, 8, and 10A). When there is no tool T to be transferred, as shown in FIG. 8, the hand 146 stays in the upper limit position in the Y1 direction, thereby allowing the tool pods 126 (tools T) moved by the chain 112 to pass smoothly between the upper plate 156 and the lower plate 158 in the X directions. In other words, the lower plates 158 (slide members 158a) are positioned complementarily within the recesses 134a, 134b and function as part of the rail 114.

The machine tool system 10 according to the first embodiment is basically constructed as described above. A process of transferring a tool T between the main stocker 80a and the auxiliary stocker 100 will be described below with reference to FIGS. 11A through 21C. The process of transferring a tool T between the other main stocker 80b and the auxiliary stocker 100 is essentially identical, and will not be described below.

FIGS. 11A through 21C are illustrative of various states of the process used for transferring a tool T between the main stocker 80b and the auxiliary stocker 100. FIG. 11A is a plan view of a portion of the tool stocker 11 near the recess 134a, FIG. 11B is a front elevational view of the portion of the tool stocker 11 near the recess 134a shown in FIG. 11A, and FIG. 11C is a side elevational view of the portion of the tool stocker 11 near the recess 134a shown in FIG. 11A. FIGS. 12A through 21C are also views similar to the views shown in FIGS. 11A through 11C.

For facilitating understanding of the invention, FIGS. 11A through 21C show the components in a more schematic fashion than in FIGS. 1 through 10B. For example, whereas the cylinder mechanism 172 of the tool transfer mechanism 140 is shown in a horizontal orientation with the axis thereof extending in the Z-axis direction in FIG. 10A, the cylinder mechanism 172 is shown in a vertical orientation, with the axis thereof extending in the Y-axis direction in FIG. 11C, thereby clearing illustrating the functions of the cylinder mechanism 172. In FIGS. 11A through 21C, the tool pods 126, which are held by the auxiliary stocker 100, are denoted in addition by the letters A through D for the sake of convenience. Hereinafter, the tool pods 126 may also be referred to as tool pods 126A through 126D. In FIG. 11C and in other similar figures, the hatched region indicates a region (machining region) within which the workpiece W is machined by the main spindle 36. The machining region is separated from the region of the tool stocker 11 by the plate 15b (see FIG. 1). The plate 15b prevents chips and machining oil from being introduced from the machining region into the tool stocker 11.

First, a sequence of delivering (returning) an unwanted tool T (a tool T to be replaced) from the main stocker 80a to the auxiliary stocker 100 will be described below with reference to FIGS. 11A through 17C. In this case, it shall be assumed that all of the holding arms 84 of the main stocker 80a have been holding respective tools T, and that the tool pod 126, which is held by at least one of the holding arms 118 of the auxiliary stocker 100, has been idle, i.e., is not carrying a tool T. The tools T on the main stocker 80a and the auxiliary stocker 100 bear respective identification addresses thereon, not shown, which make it possible for the main stocker 80a and the auxiliary stocker 100 to index any desired tools T quickly under the control of the controller 12.

As shown in FIGS. 11A through 11C, the main stocker 80a is turned such that the portion thereof that is free of the holding arms 84, and which extends in an angular range of about 90° other than the angular range of about 270° in which the holding arms 84 are angularly spaced, becomes oriented upwardly in the Y1 direction beneath the recess 134a. At the same time, the chain 112 of the auxiliary stocker 100 is moved in a circulating fashion in order to index the idle tool pod 126B, which does not have a tool T therein, in alignment with the recess 134a. Accordingly, the idle tool pod 126B becomes disposed in the hand 146 of the tool transfer mechanism 140, i.e., between the upper plate 156 and the lower plate 158.

In FIG. 11C, sensors (proximity sensors) 180, 182, 184 serve to detect whether a tool T is present or not. More specifically, the sensor 180 detects when a desired tool T has been indexed by the auxiliary stocker 100 to a position aligned with the recess 134a, and also detects when the auxiliary stocker 100 receives a desired tool T from the main stocker 80a. The sensor 182 detects when a desired tool T has been indexed by the main stocker 80a to a position aligned with the recess 134a. The sensor 184 detects when a desired tool T has been indexed to a transfer position aligned with the main spindle 36 (see FIGS. 5 and 6), and also detects when a tool T mounted on the main spindle 36 is released from the corresponding holding arm 84.

Then, as shown in FIGS. 12A through 12C, the cylinder mechanism 172 of the tool transfer mechanism 140 is actuated in order to lower the hand 146. The tool pod 126B, which is held between the upper plate 156 and the lower plate 158, is lowered in the Y2 direction while being smoothly guided by the fork 116 that engages in the slots 130, and then the fingers 142 engage within the slots 132.

As shown in FIGS. 12B and 12C, the idle tool pod 126B passes through the recess 134a and is fully removed from the holding arm 118, until the tool pod 126B becomes held by the hand 146 and the engaging member 144 of the tool transfer mechanism 140.

Then, as shown in FIGS. 13A through 13C, the cylinder mechanism 150 of the tool transfer mechanism 140 is actuated to retract the engaging member 144 in the Z2 direction, while the fingers 142 engage within the slots 132 of the tool pod 126B, thereby retracting the tool pod 126B.

In FIG. 13C, for facilitating understanding of the invention, the tool pod 126B is shown as being retracted by the cylinder mechanism 150 in unison with the hand 146. Actually, in the present embodiment, as can be seen from FIG. 10B, the hand 146 is not displaced in the Z-axis direction, but the U-shaped engaging member 144 is displaced in the Z-axis direction, thereby retracting the tool pod 126B slidingly in the hand 146. Since the slide members 156a, 156b, which are made of a material similar to the material used for the rail 114, are mounted on the upper plate 156 and the lower plate 158 of the hand 146, the slide members 156a, 156b allow the tool pod 126B to move smoothly. Of course, the cylinder mechanism 150 may also move the hand 146 in unison with the engaging member 144.

Then, as shown in FIGS. 14A through 14C, the main stocker 80a is turned to index the holding arm 84, which holds the tool T to be replaced, into alignment with the recess 134a and the tool transfer mechanism 140. At this time, as can be seen from FIGS. 14A through 14C, the tool T to be replaced is held in coaxial alignment with the idle tool pod 126B. At the same time, as shown in FIG. 14B, the opening of the grip 85 of the holding arm 84 of the main stocker 80a, and the opening of the fork 116 of the holding arm 118 of the auxiliary stocker 100, face vertically toward each other in Y directions within the vertical plane.

Then, as shown in FIGS. 15A through 15C, the cylinder mechanism 150 is actuated to move the engaging member 144 forwardly in the Z1 direction, thereby moving the tool pod 126B forward in unison therewith. The tool T to be replaced is easily and securely inserted into the tool pod 126B, which is held in coaxial alignment with the tool T.

Then, as shown in FIGS. 16A through 16C, the cylinder mechanism 172 is actuated to elevate the hand 146. The tool pod 126B, the upper and lower surfaces of which are held by the hand 146, and the tool T to be replaced, which is mounted in the tool pod 126B, are smoothly lifted in the Y1 direction while being guided by the fingers 142 that engage within the slots 132, and by the fork 116 that engages within the slots 130.

As shown in FIG. 16C, the distance YC in the vertical direction, i.e., the Y-axis direction, between the tip end of the fork 116, i.e., the lower end thereof in the Y2 direction of the holding arm 118 of the auxiliary stocker 100, and the tip end of the fingers 142, i.e., the upper end in the Y1 direction of the engaging member 144 of the tool transfer mechanism 140, is smaller than the length of the slots 130, 132 in the vertical direction, i.e., the Y-axis direction. Therefore, while the tool pod 126 is lifted or lowered by the hand 146, at least one of the fork 116 and the fingers 142 remains engaged within the slots 130, 132 at all times. Consequently, the hand 146 can stably move the tool pod 126 vertically, simply by holding the upper and lower surfaces thereof. The hand 146 can also stably move the idle tool pod 126 vertically, simply by holding the upper and lower surfaces thereof while the idle tool pod 126 is delivered, as shown in FIGS. 11A through 12C.

With the tool transfer mechanism 140 thus constructed, the hand 146 does not require a member for holding left and right side surfaces of the tool pod 126. When no tool T is being transferred, the hands 146 disposed in the respective recesses 134a, 134b serve as parts of the rail 114. When the holding arm 118 and the holding arm 84 are placed in a position to transfer the tool T (tool pod 126) shown in FIG. 16C, the tip end of the grip 85, i.e., the upper end in the Y1 direction, of the holding arm 84 lies substantially at the same height as the tip end of the fingers 142. Therefore, the tool T can be guided smoothly in the same manner as the tool pod 126.

Once the ascent of the tool pod 126 and the tool T is completed, as shown in FIGS. 17A through 17C, the tool pod 126B with the tool T mounted therein is held by the holding arm 118 of the auxiliary stocker 100. Therefore, using the idle tool pod 126B, the tool stocker 11 is able to transfer the tool T from the main stocker 80a to the auxiliary stocker 100.

A sequence of delivering (supplying) a desired tool T from the auxiliary stocker 100 to the idle holding arm 84 of the main stocker 80a, from which an unwanted tool T has been removed, will be described below with reference to FIGS. 18A through 21C.

As shown in FIGS. 18A through 18C, the auxiliary stocker 100 is actuated to index a tool pod 126C with a desired tool T mounted therein to a position aligned with the recess 134a. In other words, the tool pod 126C having the desired tool T mounted therein is placed in the hand 146 of the tool transfer mechanism 140. The stage shown in FIGS. 18A through 18C follows the stage shown in FIGS. 17A through 17C. Therefore, in this case, the idle holding arm 84 of the main stocker 80a has previously been brought into the transfer position and is aligned with the recess 134a. However, the main stocker 80a may be actuated in order to index the idle holding arm 84 to the transfer position, if necessary.

Then, as shown in FIGS. 19A through 19C, the cylinder mechanism 172 is actuated to lower the hand 146. The tool pod 126C (with the desired tool T mounted therein), the upper and lower surfaces of which are held by the hand 146, is lowered in the Y2 direction while being smoothly guided by the fork 116 that engages in the slots 130, and then by the fingers 142 that engage in the slots 132.

When lowering of the tool pod 126 and the tool T have been completed, as shown in FIGS. 20A through 20C, the tool pod 126C with the tool T mounted therein is fully released from the holding arm 118, and becomes held by the engaging member 144, which engages within the slots 132. The desired tool T, which is mounted in the tool pod 126C, is held by the grip 85 of the holding arm 84 of the main stocker 80a.

Then, as shown in FIGS. 21A through 21C, the cylinder mechanism 150 is actuated in order to retract the engaging member 144 in the Z2 direction, thereby retracting the tool pod 126C. The tool T held by the holding arm 84 is released from the tool pod 126C, whereupon only the tool pod 126C is retracted in the Z2 direction, thus completing transfer of the desired tool T to the main stocker 80a.

Subsequent operations are essentially the same as the operations described above. The idle tool pod 126C from which the tool T has been released is returned to the auxiliary stocker 100, and if necessary another tool T on the main stocker 80a may be replaced.

According to the present embodiment, as described above, in order to transfer a tool T between the main stocker 80a (80b) and the auxiliary stocker 100, the openings of the grip 85 of the holding arm 84 and the fork 116 of the holding arm 118 are placed in facing relation to each other in the vertical YZ plane, with the recess 134a (134b) being interposed therebetween (see FIG. 22). The tool transfer mechanism 140 also is positioned in alignment with the recess 134a (134b). On the auxiliary stocker 100, the tool T is held by the tool pod 126, which serves as a movable receptacle. On the main stocker 80a (80b), the tool T is held directly by the holding arm 84, without any need for the tool pod 126.

Accordingly, the tool T can be transferred between the main stocker 80a (80b) and the auxiliary stocker 100 easily when the tool pod 126 is vertically displaced by the tool transfer mechanism 140 (see FIGS. 18A through 20C, for example). For example, the action to pull the tool pod 126 (tool T) from the holding arm 84 of the auxiliary stocker 100 also doubles as an action for mounting (inserting) the tool T into the holding arm 84 of the main stocker 80a (80b). The tool T can thus be transferred essentially in one linear action. Therefore, the tool transfer mechanism 140 is capable of transferring tools T quickly and reliably with a single action, as compared with three actions of pulling, turning, and inserting the tool, according to the related art.

More specifically, since the rail 114 of the auxiliary stocker 100 includes the recesses 134a, 134b, the tool T that is movable along the rail 114 can be transferred directly to and from the main stockers 80a, 80b through the recesses 134a, 134b, without having to be moved through a turning action from the rail 114. Since no turning action is involved during transfer of the tool T, the tool T is prevented from becoming positionally displaced or dislodged, and hence the tool T can be transferred stably without incurring undue transfer failures.

More specifically, the tool transfer mechanism 140 for transferring tools T includes the hand 146 as the first moving member for moving the tool pod 126 in directions to transfer the tool T (Y directions) and which is positionable in the recess 134a (134b) so as to complement the rail 114, and the engaging member 144 as the second moving member for moving the tool pod 126 in directions to both mount and remove tools T from the tool pod 126 (Z directions). Therefore, the tool transfer mechanism 140 is capable transferring tools T based on linear movements. Since the tool transfer mechanism 140 does not require any mechanism for turning the tool T, the tool transfer mechanism 140 is simple in structure and therefore is high in reliability and durability.

The main stockers 80a, 80b may store only those tools T that are needed in order to machine the workpiece W, while the auxiliary stocker 100 may store other tools T that are not currently needed to machine the workpiece W. Consequently, the main stockers 80a, 80b may be of a minimum size required to hold only those tools T that are used on the workpiece W. Since the number of tools T stored in the main stockers 80a, 80b is held to a minimum, the rate at which tools T are selected from the main stockers 80a, 80b can be increased, thereby shortening the time required to automatically exchange tools between the main stockers 80a, 80b and the main spindle 36.

Tools T can automatically and quickly be exchanged between the main stockers 80a, 80b and the auxiliary stocker 100. Therefore, even while workpieces of a given product type that belongs to a lot that is currently being produced is machined by tools, a plurality of other tools, which are to be used on workpieces of another product type that belongs to a next lot to be produced, can successively be exchanged between the main stockers 80a, 80b and the auxiliary stocker 100.

FIG. 22 schematically shows a layout of central axes and operational centers of various elements of the machine tool system 10 according to the present embodiment.

As shown in FIG. 22, the machine tool system 10 has a turning center C1 about which the turn arm 32 for turning the main spindle 36 is turned, rotational centers C2 about which the main stockers 80a, 80b are rotatable, an operational center C3 of the tool transfer mechanism 140, and a central position C4 of the recess 134a (134b) in the rail 114. The turning center C1, the rotational centers C2, the operational center C3 and the central position C4 are aligned with each other in a common vertical YZ plane.

More specifically, the turning center C1 serves as an axis about which the turn arm 32 is turnable and the main spindle 36 is rotatable. That is, the axis of the rotational shaft of the spindle motor 38, as well as the turn arm 32, are moved in Y-axis directions and Z-axis directions within a vertical YZ plane, by the support body 22 and the column 18. The rotational centers C2 serve as axes about which the main stockers 80a, 80b are rotatable. The position where the tool T is transferred between the holding arm 84 and the main spindle 36, and the position where the tool T is transferred between the holding arm 84 and the tool transfer mechanism 140, also are positioned within the vertical YZ plane. The operational center C3 serves as a transverse center of the hand 146 and the engaging member 144, and the hand 146 and the engaging member 144 are moved in Y-axis directions and Z-axis directions within the vertical YZ plane. The central position C4 serves as a transverse center of the recess 134a (134b). The position where the tool T is transferred between the holding arm 118 and the tool transfer mechanism 140 through the recess 134a (134b) also is positioned in the vertical YZ plane.

Therefore, the machine tool system 10 essentially has no elements that are movable in transverse directions (X directions) thereof, but includes elements, central axes and operational centers, and operational directions, which are set in the vertical XY plane. The machine tool system 10 thus effectively prevents lateral wobbling and vibrating in the X-axis direction, and prevents noise due to such wobbling and vibrating movements from being produced. When a tool T is transferred between the auxiliary stocker 100 and the main stocker 80a while a workpiece W is being machined by the main spindle 36, the workpiece W still can be machined with high precision, since the main spindle 36 is not subjected to lateral wobbling or vibrating movements. The machine tool system 10 produces movements in the X-axis direction in order to machine corresponding desired regions of the workpiece W when the turn arm 32 turns the main spindle 36.

According to the present embodiment, furthermore, the auxiliary stocker 100 is disposed upwardly and rearwardly of the main stockers 80a, 80b, so as to be positioned astride the main stockers 80a, 80b. Compared to an arrangement in which the auxiliary stocker 100 is located laterally of the main stockers 80a, 80b, the auxiliary stocker 100 thus positioned can store a very large number of tools without impairing the installation space, which is narrow in the X-axis direction of the machine tool system 10. Since all movements of the elements for transferring the tool T are made within the vertical YZ plane, as described above, the machine tool system 10, which has a somewhat vertically elongated structure including the auxiliary stocker 100 in its upper portion, is effectively prevented from wobbling laterally and vibrating in X-axis directions during periods when the tool T is transferred. Stated otherwise, although the machine tool system 10 including the auxiliary stocker 100 on an upper portion thereof tends to have a somewhat high center of gravity, since movements of the elements for transferring the tool T are made within the vertical YZ plane, as shown in FIG. 22, the machine tool system 10 is effectively prevented from wobbling laterally and vibrating in the X-axis direction. Consequently, the machine tool system 10 is kept sufficiently stable as a whole.

The machine tool system 10 may include a single main stocker for transferring tools T to and from the auxiliary stocker 100, and a single machine tool associated with such a single main stocker. The machine tool system 10 may also comprise a transfer machine, including three or more main stockers, for transferring tools T to and from the auxiliary stocker 100, and three or more corresponding machine tools associated with each of such main stockers.

In the above embodiment, tools T are transferred vertically between the main stockers 80a, 80b and the auxiliary stocker 100. Under certain conditions, however, the auxiliary stocker 100 may be located laterally of the main stockers 80a, 80b. In this case, the tool transfer mechanism 140 may be actuated in a horizontal plane in order to transfer tools T horizontally between the auxiliary stocker 100 and the main stockers 80a, 80b. If the machine tool system 10 includes a single main stocker and a single machine tool, then since spaces are created on both sides of the main stocker, the machine tool system 10 is more easily put to practical use.

A second embodiment of the present invention will be described below.

Figure 23:
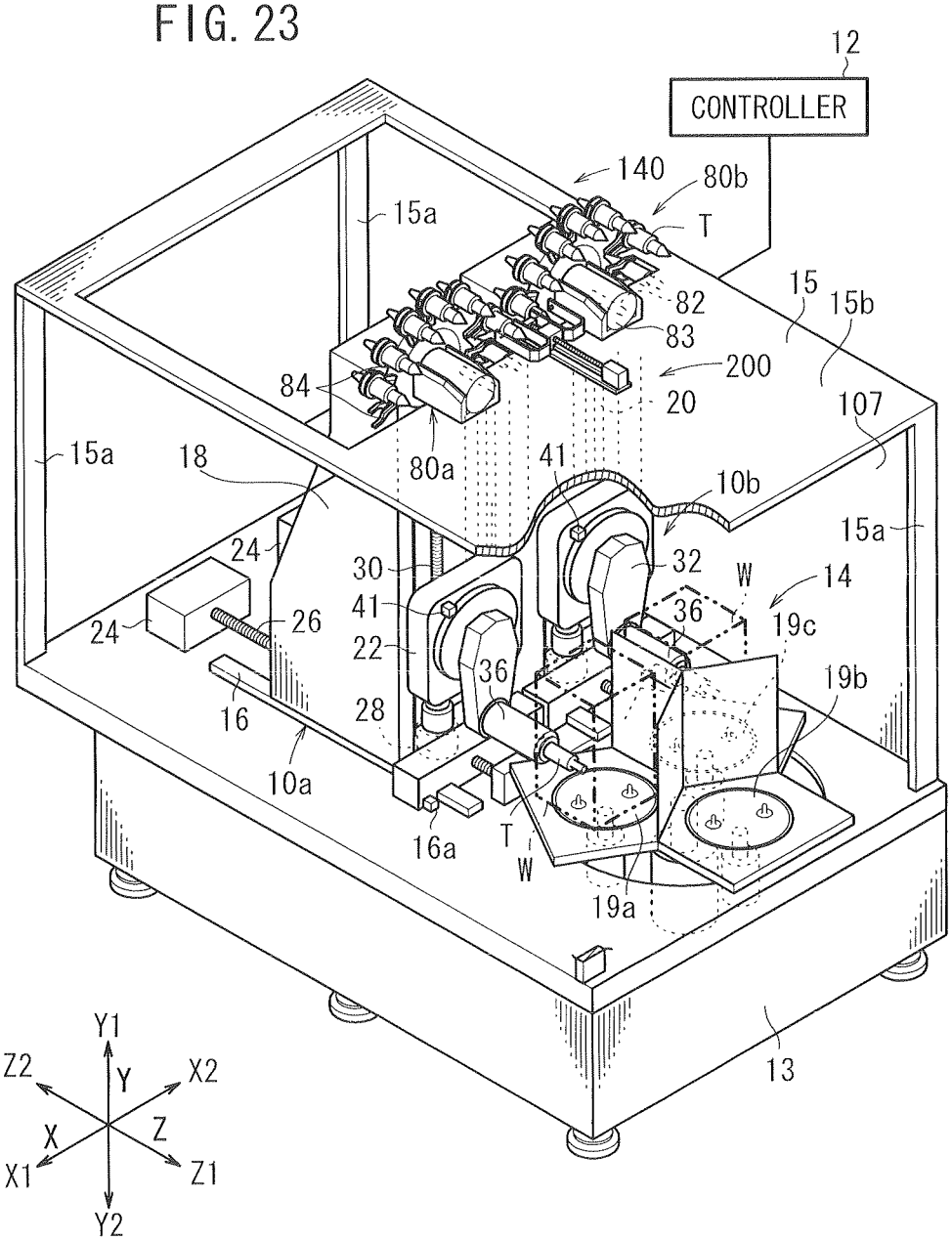
FIG. 23 is a perspective view, partially cut away, of a machine tool system incorporating therein a tool damage detecting apparatus according to a second embodiment of the present invention.

FIG. 23 is a perspective view, partially cut away, of a machine tool system 101 incorporating therein a tool damage detecting apparatus according to the second embodiment of the present invention. Those components of the machine tool system 101 which are identical in structure, function, and advantage to those of the machine tool system 10 according to the first embodiment are denoted using identical reference characters, and such components will not be described in detail below.

As shown in FIG. 23, the machine tool system 101 does not include the auxiliary stocker 100 of the machine tool system 10 shown in FIG. 1, and includes a tool damage detecting apparatus 200, which is disposed between the two main stockers (tool stockers, tool magazines) 80a, 80b. The machine tool system 101 may incorporate additional components, apart from the tool damage detecting apparatus 200, which are identical to those of the machine tool system 10 shown in FIG. 1. For example, if desired, the machine tool system 101 may include the auxiliary stocker 100.

Figure 24:
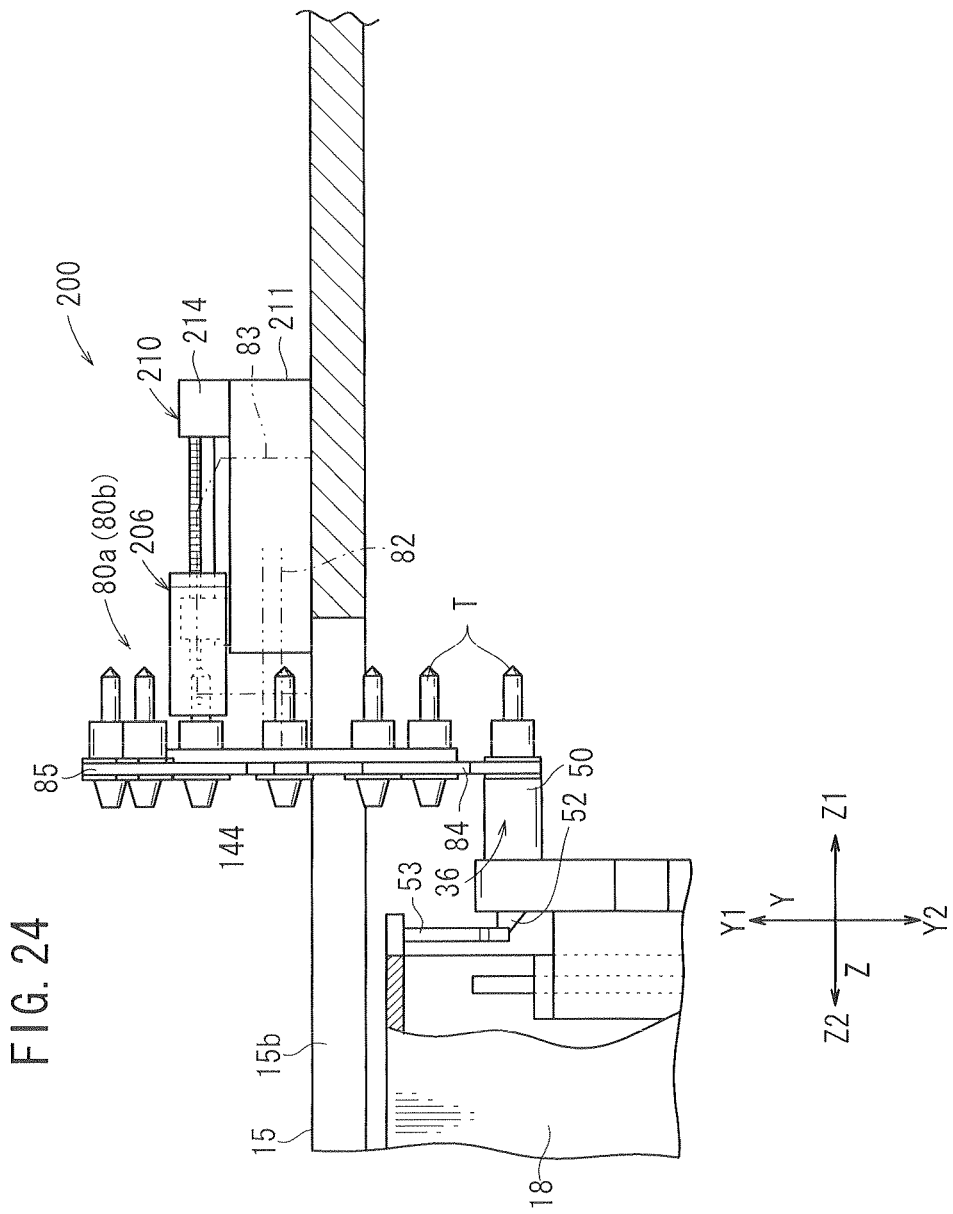
FIG. 24 is an enlarged side elevational view of a column, a main stocker, and nearby parts, at a time when tools are changed in the machine tool system of FIG. 23.

As shown in FIGS. 23 and 24, the frame 15 supports thereon the main stockers 80a, 80b that serve as tool stockers, each of which stores or holds a plurality of tools T therein, and the tool damage detecting apparatus 200, which is capable of simultaneously handling the main stockers 80a, 80b. The main stockers 80a, 80b and the tool damage detecting apparatus 200 are constructed as independent units apart from the first machine tool 10a and the second machine tool 10b, which serve as machining units, and the main stockers 80a, 80b are disposed outside of the machining region where the workpiece W is machined. The main stockers 80a, 80b and the tool damage detecting apparatus 200 are shielded by the plate 15b from chips and machining oil that may be produced while the workpiece W is being machined.

The tool damage detecting apparatus 200, which is disposed between the two main stockers 80a and 80b, detects, substantially simultaneously, damage to two tools T that are stored respectively on the main stockers 80a, 80b. Damage to the tools T may include breakage and chipping of the cutting edges of the tools T, which may consist of drill bits or the like.

Figure 25:
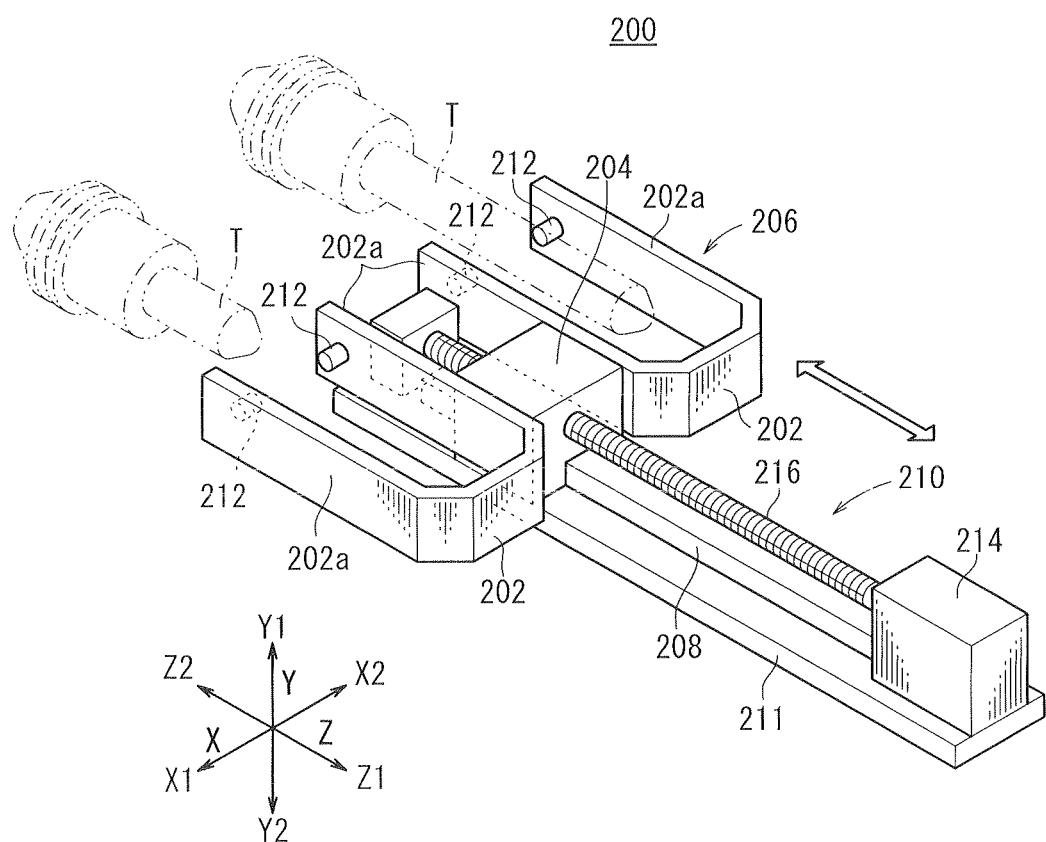
FIG. 25 is a perspective view of the tool damage detecting apparatus shown in FIG. 23.
Figure 26:
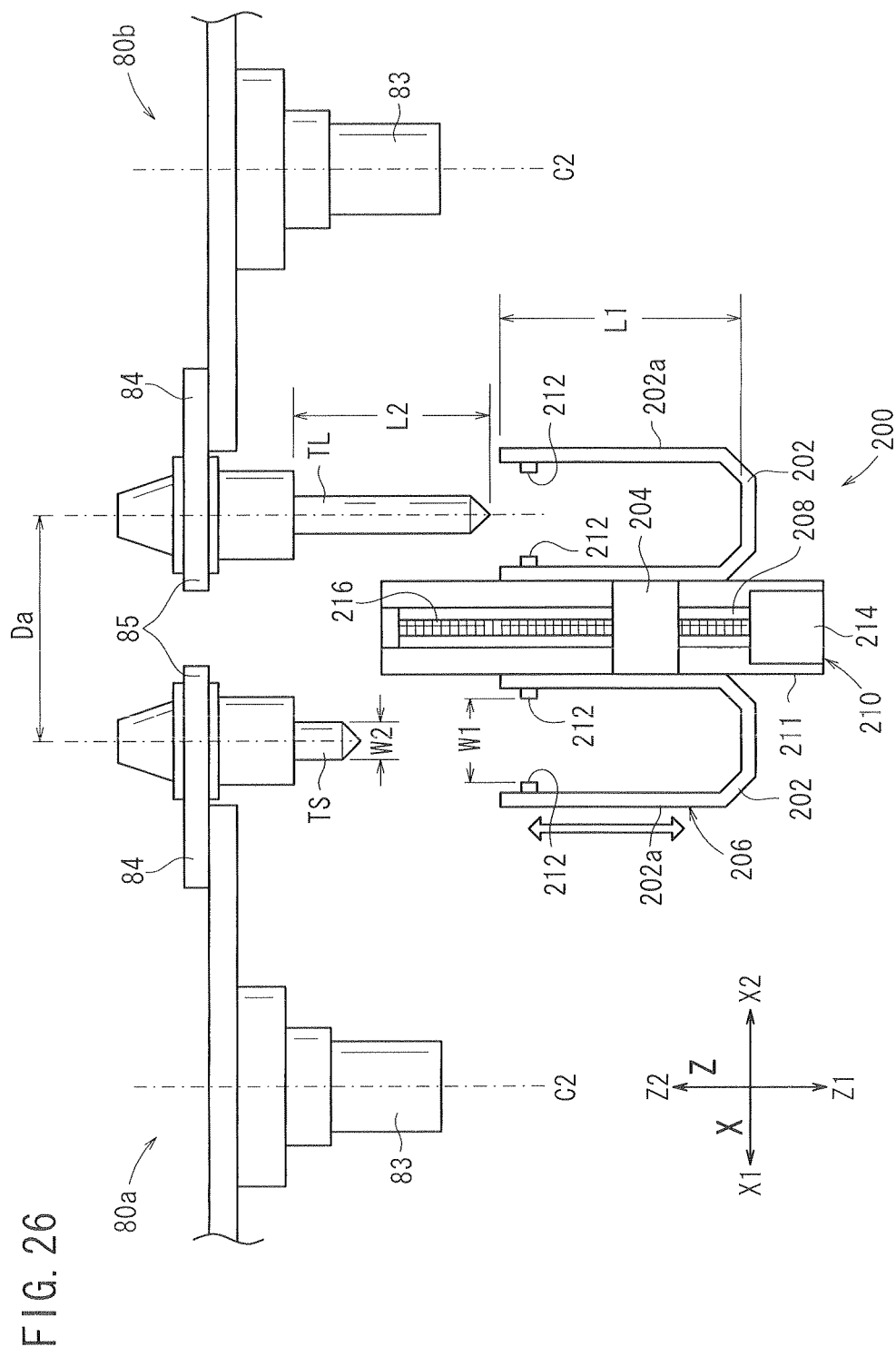
FIG. 26 is a plan view, partially omitted from illustration, of the tool damage detecting apparatus shown in FIG. 23, together with main stockers which have tools therein indexed to a tool damage detecting position.

As shown in FIGS. 25 and 26, the tool damage detecting apparatus 200 comprises a substantially W-shaped bracket 206 constructed from two substantially U-shaped tool approaching devices (tool insertion members) 202 coupled to each other by a movable nut 204, a moving mechanism 210 for moving the bracket 206 along a rail 208 extending in the Z-axis direction, and a base member 211 that supports thereon the bracket 206 and the moving mechanism 210.

Each of the tool approaching devices 202 of the bracket 206 can receive a tool T inserted therein between a pair of wall members 202a that extend in the Z-axis direction and which face toward each other. The tool T, when it is inserted into each of the tool approaching devices 202, can be detected by a sensor (detector) 212 mounted on facing inner wall surfaces of the wall members 202a. The sensor 212 comprises, for example, a contactless (photoelectric) detector having a light emitter and a light detector, which are mounted respectively on facing inner wall surfaces of the wall members 202a. The sensor 212 detects the tool T when the tool T interrupts a light beam, which is emitted from the light emitter toward the light detector.

The moving mechanism 210 comprises a motor 214, which is fixedly mounted on the base member 211, and a ball screw 216 connected to the rotatable shaft of the motor 214 and threaded through the movable nut 204. When the motor 214 is energized, the ball screw 216 is rotated about its axis, thereby moving the movable nut 204 and hence the bracket 206 (tool approaching devices 202) along the rail 208 on the base member 211.

As shown in FIG. 26, the tool damage detecting apparatus 200 is disposed in alignment with a position (tool damage detecting position) in which the tools T stored on the main stockers 80a, 80b and turned by holding arms 84 are positioned closest to each other and are spaced from each other by a minimum distance Da between the main stockers 80a, 80b.

Among the tools T used in the machine tool system 101, a tool whose axial length is the smallest is referred to as a tool TS, and a tool whose axial length is the greatest is referred to as a tool TL. FIG. 26 is a plan view, partially omitted from illustration, of the tool damage detecting apparatus 200, in which the main stocker 80a has indexed the shortest tool TS to the tool damage detecting position, while the other main stocker 80b has indexed the longest tool TL to the tool damage detecting position. In this case, the shortest and longest tools TS and TL have respective axes spaced from each other by the distance Da.

As shown in FIG. 26, the width W1 of the sensor 212, i.e., the distance between the light emitter and the light detector, or in other words, the distance W1 between the paired wall members 202a, is greater than the width W2 (diameter or width as viewed in plan) of the tool T (TS, TL). Also, the length (depth) L1 of the tool approaching devices 202 in the axial direction thereof, i.e., the Z-axis direction, is greater than the length of the longest tool TL in the axial direction. Usually, the distance between the paired wall members 202a is greater than the distance W1 between the light emitter and the light detector. Therefore, when the tool approaching devices 202 are moved toward the main stockers 80a, 80b by the moving mechanism 210, the tools T (TL, TS) are inserted into the openings of the U-shaped tool approaching devices 202, without causing any physical interference therewith.

FIG. 27 is a fragmentary front elevational view showing a layout of the tools T that are stored in the main stockers 80a, 80b, and the tool approaching devices (wall members 202a) of the tool damage detecting apparatus 200. In FIG. 27, for facilitating understanding of the invention, the sensors 212 have been omitted from illustration. Also, to facilitate understanding, the distance between the paired wall members 202a is shown as being equal to the width W1.

As shown in FIG. 27, the rotational centers about which the main stockers 80a, 80b are rotatable are indicated by C2. The distances from the rotational centers C2 to the wall members 202a, which are closer to the rotational centers C2, are indicated by D1. The distances from the rotational centers C2 to the wall members 202a, which are more remote from the rotational centers C2, are indicated by D2. When the tools T are turned by the main stockers 80a, 80b, the tools T have outer and inner surfaces thereof following outer and inner tracks, respectively. The inner tracks that are closer to the rotational centers C2 are indicated by Tr1, whereas the outer tracks that are more remote from the rotational centers C2 are indicated by Tr2. The radii of the inner and outer tracks Tr1, Tr2 around the rotational centers C2 are indicated by R1 and R2, respectively. In FIG. 27, the distances D1, D2 are shown as radii of curvature from the rotational centers C2, for easier understanding of the invention. Actually, however, since the wall members 202a do not move in the Y directions, the distances D1, D2 represent linear distances in the X-axis direction between the wall members 202a and the rotational centers C2. Stated otherwise, the distances D1, D2 are maintained as X-direction distances at the opposite ends of the wall members 202a in the vertical direction, i.e., in the Y-axis direction.

As shown in FIG. 27, the tracks Tr1, Tr2 can pass within the spaces represented by the differences between the distances D1, D2, i.e., the spaces represented by the widths W1. In other words, it is preferable for the distances D1 to be smaller than the radii R1, R2 (D1<R1<R2), and for the distances D2 to be greater than the radii R1, R2 (D2>R2>R1). With these dimensional settings, when the tool approaching devices 202 are displaced closer to the tools T, as shown in FIGS. 29A and 29B, rather than being spaced from the tools T as shown in FIG. 26, the tools T and the wall members 202a (sensors 212) of the tool approaching devices 202 do not physically interfere with each other, so that the main stockers 80a, 80b and the tool damage detecting apparatus 200 can operate smoothly.

The length L1 of the two tool approaching devices 202 of the bracket 206 is large enough to handle the shortest and the longest tools TS, TL, such that the two tool approaching devices 202 do not physically interfere with the tools T that are turned by the main stockers 80a, 80b. Thus, the tool damage detecting apparatus 200 has an interference prevention structure for avoiding physical interference with all of the tools T that are stored in the main stockers 80a, 80b, regardless of whether the bracket 206 is moved toward or away from the main stockers 80a, 80b by the moving mechanism 210.

The machine tool system 101 according to the second embodiment basically is constructed as described above. A process of detecting damage to a tool T, which is performed by the tool damage detecting apparatus 200 of the machine tool system 101, shall be described below with reference to FIG. 28. FIG. 28 shows a flowchart of a damage detecting sequence of the tool damage detecting apparatus 200 according to the second embodiment.

In step S1 shown in FIG. 28, tools T are held by the holding arms 84 (grips 85) of the main stockers 80a, 80b (tool holding step). For example, when the machine tool system 101 starts to operate, various tools T, which are to be used on the workpiece W, are manually or otherwise placed on the holding arms 84 of the main stockers 80a, 80b. Alternatively, while the machine tool system 101 is machining a workpiece W, the column 18 and the support body 22 are actuated to transfer a used or unwanted tool T from the main spindle 36 to the holding arm 84. Therefore, step S1 also serves as a tool storing step for storing a number of tools T on the main stockers 80a, 80b, which are independent of the first machine tool 10a and the second machine tool 10b, such that any desired one of the stored tools T can be indexed to a desired position.

As shown in FIGS. 26 and 27, the tool damage detecting apparatus 200 includes the interference prevention structure, referred to above, for avoiding physical interference with the tools T that are stored in the main stockers 80a, 80b. When the tools T are held and stored in the main stockers 80a, 80b, no problem is posed by the position in the Z-axis direction to which the bracket 206 (tool approaching devices 202) is moved by the moving mechanism 210. However, in the following description, it shall be assumed that step S1 is carried out while the bracket 206 is closest to the tools T in the Z2 direction, as shown in FIG. 29A.

In step S2, the main stockers 80a, 80b are turned under the control of the controller 12 in order to index tools T, which are to be inspected for damage, to the tool damage detecting position (see FIGS. 26 and 27). Specifically, two out of the tools T stored in the main stockers 80a, 80b are indexed to a position where the two tools T are closest to each other, and are spaced from each other by a minimum distance Da. The two tools T to be inspected are then inserted respectively into the tool approaching devices 202, which have been displaced in the Z2 direction (see FIG. 29A).

The main stockers 80a, 80b can easily and quickly index desired tools T under the control of the controller 12, based on the identification addresses (not shown), which are borne by and appear on the tools T. Stated otherwise, the controller 12 stores information concerning the axial lengths of the tools T indexed to the tool damage detecting position at a time when the tools T are normal, i.e., when the tools T are not damaged.

In step S3, the tool damage detecting apparatus 200 is activated in order to confirm damage to the tools T that have been indexed to the tool damage detecting position. More specifically, the moving mechanism 210 is actuated to retract the tool approaching devices 202 in the Z1 direction, from the position shown in FIG. 29A to the position shown in FIG. 29B. In FIGS. 29A and 29B, the cutting edge of the tool TS, which is stored on the main stocker 80a, is shown to be broken, as indicated by the broken lines.

The sensors 212 are fixed to the wall members 202a at positions for detecting both the tip end (cutting edge) of the shortest tool TS and the tip end (cutting edge) of the longest tool TL, when the tool approaching devices 202 are displaced from the position shown in FIG. 29A, which is closest to the tools T, to the position shown in FIG. 29B, which is remotest from the tools T. In step S3, therefore, while the tool approaching devices 202 are retracted by the moving mechanism 210 along the tools T and away from the main stockers 80a, 80b, the sensors 212 can easily detect any damage to the tools T that are stored on the main stockers 80a, 80b, and which have various lengths ranging from the smallest length to the largest length. Instead of displacing the bracket 206 away from the main stockers 80a, 80b, when the sensors 212 detect damage to the tools T, the bracket 206 may also be displaced from the position shown in FIG. 29B to the position shown in FIG. 29A.

More specifically, in step S3, when the bracket 206 is displaced, a linear sensor, not shown, detects the distance that the tool approaching devices 202 (sensors 212) have moved, from the position closest to the tools T or the position remotest from the tools T. The tools T, which have been indexed to respective tool damage detecting positions, have proximal ends thereof maintained at constant positions in the Z-axis direction.

Based on the detected distance that the tool approaching devices 202 (sensors 212) have moved, together with the information of the axial lengths of the tools T, which are assumed to be normal, and that are indexed to the tool damage detecting positions, in step S4, the controller 12 determines whether the detected tip ends (cutting edges) of the tools T are positioned within a normal damage-free positional range or not. If the sensors 212, which are positioned as shown in FIG. 29A, detect the cutting edges of the tools T, e.g., the cutting edge of the tool TL as indicated by the solid lines in FIG. 29A, then the controller 12 judges that the tools T are free of damage. On the other hand, if the sensors 212 do not detect the cutting edges of the tools T, e.g., the damaged cutting edge of the tool TS as indicated by the broken lines in FIG. 29A, then the controller 12 judges that the tools T are damaged.

If the tools T are judged as being free of damage in step S4, then since the tools are normal, control goes back to step S1, and the tool damage detecting process is repeated on the next tools T. If at least one of the tools T is judged as being damaged in step S4, then the controller 12 energizes a speaker, a lamp, or another indicator, not shown, so as to issue a warning in step S5. Therefore, the operator is quickly notified of any damaged tools T, and can take appropriate actions in order to replace or service such damaged tools T. While the operator replaces or services a damaged tool T, the machine tool system 102 may be shut down. Alternatively, if the damaged tool T is not expected to be used on the workpiece W that is currently being machined, then the machine tool system 102 needn't be shut down, and the workpiece W may be machined continuously. At the same time, the controller 12 may perform a control process for preventing the damaged tool T from being mounted on the main spindle 36 until the damaged tool T has been replaced with a normal tool T. Control may then return to step S1 so that other tools T may be inspected for damage.

It is not strictly necessary that step S1 be carried out. If tools T that have already been held and stored on the main stockers 80a, 80b are used repeatedly over a succession of days, wherein the above tool damage detecting process is carried out as a daily inspection process before the machine tool system 101 is operated initially in each of the days, then step S1 may be dispensed with, and the exiting tools T, which are stored on the main stockers 80a, 80b, may successively be inspected for damage according to the tool damage detecting process, starting with step S2.

As described above, the tool damage detecting apparatus 200 includes the pair of tool approaching devices 202, for simultaneously handling the two main stockers 80a, 80b, respectively. The tool damage detecting apparatus 200 detects damage to the tools T by moving the bracket 206, which supports the tool approaching devices 202, to or from the main stockers 80a, 80b in the axial direction of the tools T. More specifically, the tool damage detecting apparatus 200 detects damage to the tools T at the main stockers 80a, 80b, which store the tools T, rather than at the machining units that machine the workpieces W, such as the first machine tool 10a and the second machine tool 10b.

Therefore, the tool damage detecting apparatus 200 can detect damage to tools T that have been used to machine workpieces W mounted on the main spindle 36 and then returned to the main stockers 80a, 80b, while the workpieces W are being machined by other tools T. If damage to at least one of the inspected tools T is detected, then the tool T can quickly be replaced by another tool T from the main stocker 80a or 80b. If the damaged tool T is not scheduled to machine a workpiece for a long period of time, then the damaged tool T may be left as is and, if necessary, may be controlled so as not to be mounted on the main spindle 36.

Each time a tool T is mounted on the main spindle 36 for machining a workpiece W, the tool T is checked for any damage and is effectively prevented from being used to machine the workpiece if the tool T is found to be damaged. Since workpieces W can continuously be machined by the machining units while tools T are being inspected for damage at the main stockers 80a, 80b, the machine tool system 101 does not need to be shut down in the event that damage to the tools T being inspected is discovered. Consequently, the cycle time of the machine tool system 101 can be shortened, and production efficiency can be improved accordingly.

The tool damage detecting apparatus 200 is disposed in association with the main stockers 80a, 80b outside of the machining region where the workpieces W are machined. Therefore, the sensors 212 are prevented from malfunctioning due to chips and machining oil, which are produced when the workpieces W are machined. At the same time, the moving mechanism 210 also is prevented from being adversely affected by such chips and machining oil. Accordingly, the moving mechanism 210 can control movement of the bracket 206 accurately, and hence the tool damage detecting apparatus 200 can detect damage to tools T accurately.

The tool damage detecting apparatus 200 includes an interference prevention structure, referred to above, for simultaneously avoiding physical interference with the shortest and longest tools TS, TL among all of the tools T used in the machine tool system 101 (see FIGS. 26 and 27). Since the tool damage detecting apparatus 200 is capable of simultaneously detecting damage to tools T of different types, the tool damage detecting apparatus 200 is highly versatile. Furthermore, while tools T stored on one of the main stockers 80a are being inspected for damage by the tool damage detecting apparatus 200, other tools T can automatically be exchanged between the other main stocker 80b and the main spindle 36. Thus, the tool damage detecting apparatus 200 can avoid system shutdowns as a result of detecting damage to tools, thereby allowing the machine tool system 101 to have better production efficiency.

The tool damage detecting apparatus 200 is installed at a position (tool damage detecting position) where two tools T stored on the main stockers 80a, 80b and turned by the holding arms 84 are closest to each other, and which are spaced from each other by the distance Da (see FIGS. 26 and 27). Therefore, the bracket 206 that supports the tool approaching devices 202 may be small in size, and the moving mechanism 210 for moving the bracket 206 may also be small in size and have a low output power requirement. Consequently, the tool damage detecting apparatus 200 is small in size and weight, and may be installed with high freedom.

Figure 30:
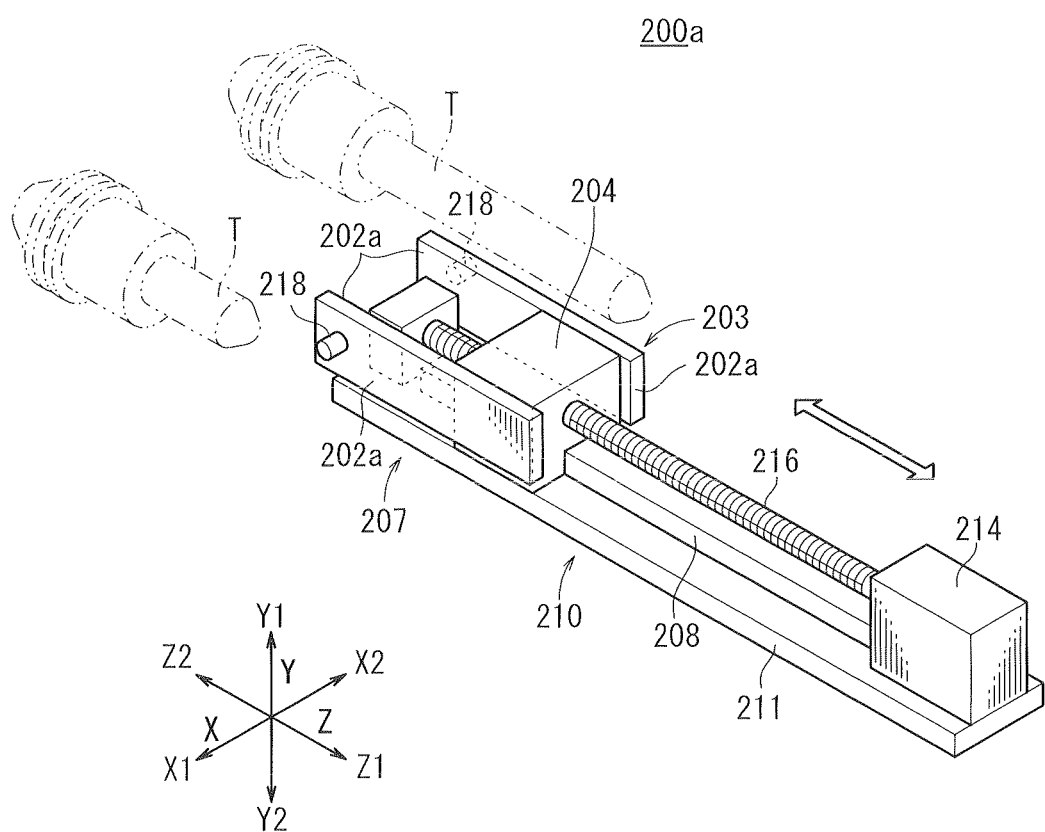
FIG. 30 is a perspective view of a tool damage detecting apparatus according to a first modification.

The tool approaching devices of the tool damage detecting apparatus may consist of shapes other than the U shape. FIG. 30 shows in perspective a tool damage detecting apparatus 200a according to a first modification. As shown in FIG. 30, the tool damage detecting apparatus 200a according to the first modification includes a bracket 207 having a straight tool approaching device 203, which comprises a pair of wall members 202a coupled to each other by a movable nut 204. The tool approaching device 203 also includes a pair of sensors (detectors) 218 for detecting damage to the tools T. Each of the sensors 218 may comprise a contactless proximity sensor, for example, which forms a single-element device. Therefore, the tool damage detecting apparatus 200a is smaller in size and weight and can be constructed easily, because the straight tool approaching device 203 constructed in this manner includes fewer elements, and is designed so as to be capable of achieving interference prevention.

Figure 31:
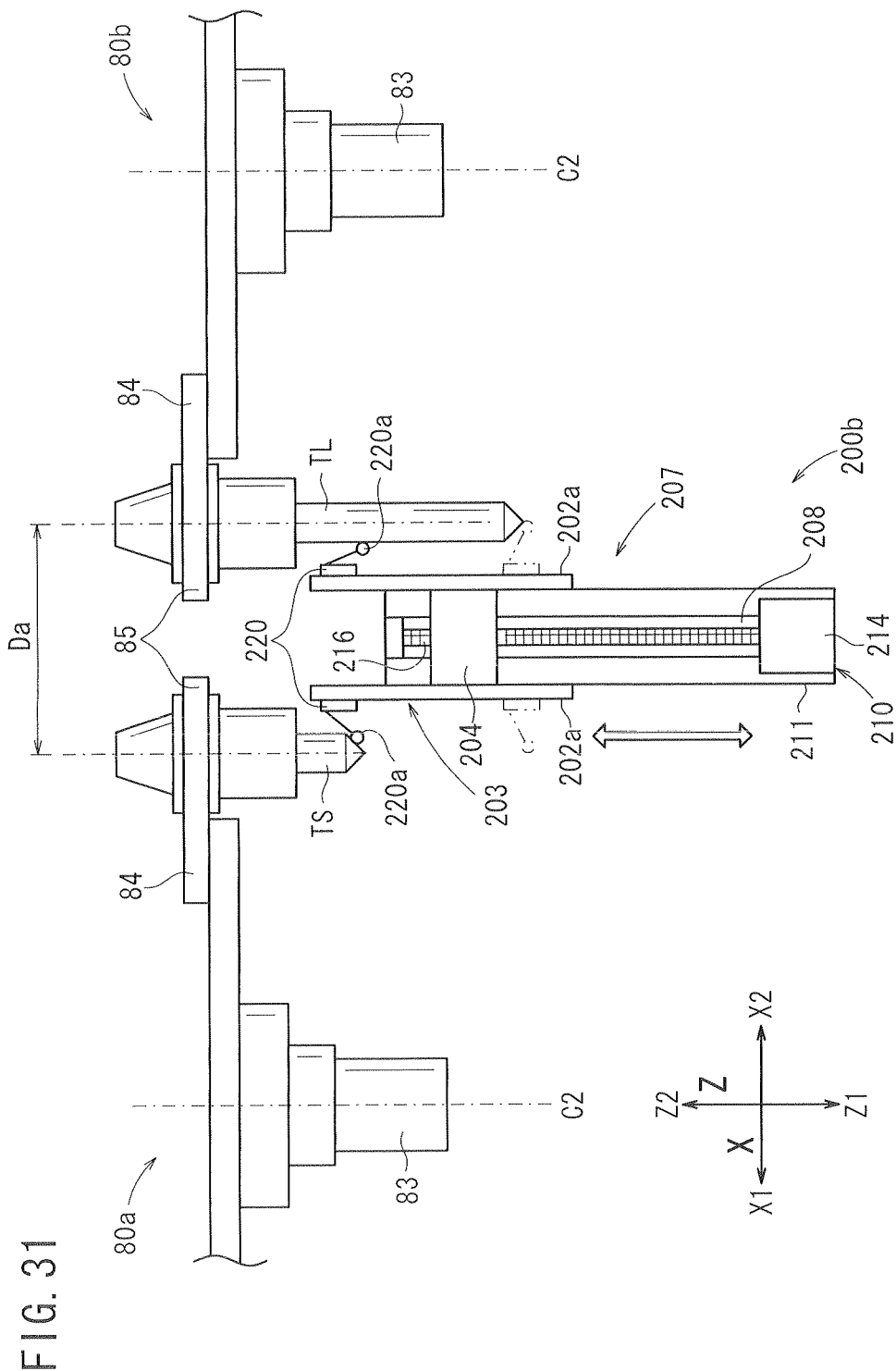
FIG. 31 is a plan view showing a tool damage detecting apparatus according to a second modification, and main stockers having indexed tools in a tool damage detecting position.

FIG. 31 shows in plan a tool damage detecting apparatus 200b according to a second modification. The tool damage detecting apparatus 200b includes a pair of contact-type sensors 220, which detect damage to the tools T. Each of the sensors 220 comprises a proximity sensor for detecting a tool T when a resilient contact 220a is angularly displaced as a result of coming into contact with the tool T.

Each of the machine tool systems 10, 101 described above has two main stockers. However, the machine tool systems may include three or more main stockers. FIG. 32 shows in front elevation a machine tool system according to a third modification, which includes two main stockers 80a, 80b, together with another main stocker 80c having an inverted orientation and which is disposed above the main stockers 80a, 80b. The machine tool system also includes a tool damage detecting apparatus 200c associated with the main stocker 80c, which is combined integrally with or may be separate from the tool damage detecting apparatus 200 associated with the main stockers 80a, 80b. FIG. 33 shows in front elevation a machine tool system according to a fourth modification, which includes a linear array of three main stockers 80a, 80b, 80c. The machine tool system also includes two tool damage detecting apparatus 200, which may be combined integrally with each other or made separate from each other, and three tool damage detecting apparatus 200c, which may be integrally combined with or made separate from the tool damage detecting apparatus 200. If three or more main stockers are provided, then either one of the tool damage detecting apparatus may be installed at a tool damage detecting position where respective tools T on two of the main stockers are closest to each other (see FIGS. 26 and 27).

The tool approaching devices shown above are of a U-shaped or straight shape. However, a tool approaching device may be formed in a rod shape or a tubular shape, which allows sensors to be installed thereon for detecting damage to tools T. If a tubular tool approaching device is employed, then a tool T needs to be removed from the tubular tool approaching device when main stockers associated therewith are turned. Three or more tool approaching devices may be mounted on a common bracket, for simultaneously inspecting three or more tools stored in a single main stocker.

Rather than the illustrated ball screw mechanism, the moving mechanism of the tool damage detecting apparatus may comprise a linear mechanism, a swingable link mechanism, a rack and pinion mechanism, or the like for moving the bracket including the tool approaching devices toward and away from the main stockers.

The machining unit may comprise a single machine tool, and two main stockers may be associated with the single machine tool.

Although certain preferred embodiments of the present invention have been shown and described in detail, it should be understood that various changes and modifications may be made to the embodiments without departing from the scope of the invention as set forth in the appended claims.

What is claimed is:

1. A machine tool system comprising:
   a main spindle for supporting a tool detachably mounted thereon for machining a predetermined region of a workpiece;
   a first tool stocker for holding a plurality of tools to be detachably mounted on the main spindle, the first tool stocker being rotatable to index the tools;
   a second tool stocker for holding a plurality of tools, the second tool stocker including a rail along which the tools held in the second tool stocker are slid; and
   a tool transfer mechanism for transferring tools between the first tool stocker and the second tool stocker,
   wherein the main spindle has a turning center about which the main spindle is rotatable, the first tool stocker has a rotational center about which the first tool stocker is turnable, and the rail of the second tool stocker has a recess at a tool transfer position, through which recess the tools are moved via the tool transfer mechanism in order to transfer the tools to the first tool stocker from the second tool stocker, and from the first tool stocker to the second tool stocker, and
   wherein the turning center, the rotational center, and the tool transfer position are located in a substantially identical vertical plane.

2. A machine tool system according to claim 1, wherein the first tool stocker has a tool transfer position for transferring tools to and from the tool transfer mechanism, the tool transfer position of the first tool stocker being located in the substantially identical vertical plane.

3. A machine tool system according to claim 2, wherein the tool transfer position of the second tool stocker is located above the tool transfer position of the first tool stocker.

4. A machine tool system according to claim 1, further comprising:
   a rotational drive source for rotating the tool supported on the main spindle, the rotational drive source being coaxial with a turning center about which a turn arm to which the main spindle is attached is rotatable.

5. A machine tool system according to claim 1,
   wherein the first tool stocker has a plurality of first holders for holding the tools, the first holders extending radially outwardly from the rotational center about which the first tool stocker is rotatable, and the second tool stocker has a plurality of second holders for holding tool pods, the first holders and the second holders having respective openings for holding the tools therein; and
   wherein the first holders and the second holders are disposed such that when a tool is transferred between one of the first holders of the first tool stocker and one of the second holders of the second tool stocker, the opening of the one of the first holders and the opening of the one of the second holders face each other in the substantially identical vertical plane.

* * * * *